US008038826B2

(12) United States Patent
Kucera et al.

(10) Patent No.: US 8,038,826 B2

(45) Date of Patent: Oct. 18, 2011

(54) TABBED DIVIDER MAKING APPARATUS AND METHOD

(75) Inventors: Mark Kucera, Howell, MI (US); Kevin Hartnett, Chatham, NJ (US); Thomas J. Richmond, Warren, MI (US)

(73) Assignee: Scott Office Systems, LLC, Greensboro, NC (US)

( * ) Notice: Subject to any disclaimer, the term of this patent is extended or adjusted under 35 U.S.C. 154(b) by 789 days.

(21) Appl. No.: 12/009,828

(22) Filed: Jan. 22, 2008
(Under 37 CFR 1.47)

(65) Prior Publication Data

US 2009/0026752 A1 Jan. 29, 2009

Related U.S. Application Data

(60) Provisional application No. 60/898,830, filed on Feb. 1, 2007, provisional application No. 60/904,561, filed on Mar. 1, 2007.

(51) Int. Cl.

| | |
|---|---|
| ***B29C 65/00*** | (2006.01) |
| ***B32B 37/02*** | (2006.01) |
| ***B32B 38/00*** | (2006.01) |
| ***B32B 38/04*** | (2006.01) |
| ***B31B 1/14*** | (2006.01) |
| ***B31B 49/00*** | (2006.01) |

(52) U.S. Cl. ........ 156/253; 156/250; 156/252; 156/256; 156/510; 156/516; 156/517; 156/556; 156/558; 156/564; 493/340; 493/341; 493/342; 493/343; 493/344; 493/345; 493/347; 493/348; 493/349; 493/361

(58) Field of Classification Search .......... 156/250–253, 156/256, 510, 516, 517, 538, 539, 555, 556, 156/558, 559, 564; 283/41; 493/340–345, 347–349, 357, 361, 364, 374
See application file for complete search history.

(56) References Cited

U.S. PATENT DOCUMENTS

| | | | | |
|---|---|---|---|---|
| 3,245,859 | A * | 4/1966 | Busk | 156/479 |
| 3,921,344 | A | 11/1975 | Goodwin | |
| 4,092,817 | A | 6/1978 | Rist, III | |
| 4,183,779 | A * | 1/1980 | Barber et al. | 156/361 |
| 4,588,463 | A | 5/1986 | Barber et al. | |
| 4,819,021 | A | 4/1989 | Doery | |
| 4,846,774 | A | 7/1989 | Bell | |
| 5,020,926 | A | 6/1991 | Wilhelm | |
| 5,068,005 | A | 11/1991 | Lindskog et al. | |
| 5,108,356 | A | 4/1992 | Rickenbach | |
| 5,259,826 | A | 11/1993 | Woods | |
| 5,262,834 | A | 11/1993 | Kusaka et al. | |
| 5,401,058 | A * | 3/1995 | Holmberg | 283/62 |
| 5,423,617 | A | 6/1995 | Marsh et al. | |
| 6,191,382 | B1 | 2/2001 | Damikolas | |

(Continued)

OTHER PUBLICATIONS

International Search Report, PCT/US2008/01034.

(Continued)

*Primary Examiner* — Mark A Osele
*Assistant Examiner* — Christopher C Caillouet
(74) *Attorney, Agent, or Firm* — Alston and Bird, LLP

(57) ABSTRACT

An improved tabbed divider making apparatus is disclosed. The machine preferably improves upon existing tabbed divider making machines in its ease of use and efficiency. Among other elements, the machine may include a paper feeder, a processing section, and an output tray. An improved film delivery system is also disclosed, as well as methods relating to manufacturing of tabbed dividers.

37 Claims, 43 Drawing Sheets

U.S. PATENT DOCUMENTS

| | | | | |
|---|---|---|---|---|
| 6,435,246 | B1 | 8/2002 | Kerr | |
| 6,463,981 | B1 | 10/2002 | Kerr | |
| 6,569,588 | B2 | 5/2003 | Oikawa et al. | |
| 6,670,087 | B2 | 12/2003 | Fujikawa et al. | |
| 6,890,397 | B1 | 5/2005 | Weirather et al. | |
| 7,588,066 | B2 * | 9/2009 | Parker et al. | 156/584 |
| 2006/0191426 | A1 | 8/2006 | Timmerman et al. | |
| 2009/0270237 | A1 * | 10/2009 | Kucera et al. | 493/323 |
| 2011/0065562 | A1 * | 3/2011 | Kucera et al. | 493/416 |

OTHER PUBLICATIONS

Advent, advertisement, Oct. 1993.
Advent, Internet advertisement, Jan. 2001.
Halm, Super Jet Brochure, date unknown.
Binding Supplies, Tabcutter Brochure, date unknown.
Autofeeds, Titan Tabber Brochure, Aug. 2001.
Widman, Product Brochure, date unknown.
E-Z Machine Corp, General Product Brochure, date unknown.
E-Z Machine Corp, Laminator and Tab-Cutter Flyer, date unknown.
Advent, Brochure, date unknown.
Scott Office Systems, RHP 7000 Brochure, date unknown.
The Scott Ten Thousand Brochure, date unknown.
Scotty 5000 Brochure, date unknown.
Scott Brochure for Certain Manual Machines, date unknown.
International Search Report, PCT/US2009/00955.

* cited by examiner

TABBED DIVIDER MAKING APPARATUS AND METHOD

CROSS-REFERENCE TO RELATED APPLICATIONS

This application claims the benefit of the filing date of U.S. Provisional Patent Application Nos. 60/898,830 filed Feb. 1, 2007 and 60/904,561 filed Mar. 1, 2007, the disclosures of which are hereby incorporated herein by reference.

BACKGROUND OF THE INVENTION

The present invention relates to apparatus and methods for providing paper stock with tabs or the like, and more particularly, to an improved tab making machine and method that is automated and more user-friendly.

Tabbed dividers are often utilized in separating sections of binders, presentations or the like. Typically, these tabbed dividers are thickened pieces of paper stock having a tab extending a distance at least slightly beyond that of normal paper length or width for ease of access to different sections of a multi-section document/presentation. Whether punched with holes, or utilized as file folders, such tabbed dividers are important in organizing documents and other papers. With the emergence of easy in-house printing and copying, the use of such dividers has only increased. Many businesses make use of such dividers on a regular basis, and must therefore have hundreds or even thousands of such dividers on hand. Some may include pre-printed tab portions for particular uses, while others may be generic labels or simply left blank. No matter what types of tabbed dividers are utilized, their usefulness is evident and such are constantly in demand.

Given the tremendous amount of tabbed dividers utilized in business today, the manufacture of same is very important. The general operation of a known tab making apparatus includes feeding paper stock or other suitable material to a sheer or other cutting apparatus. This step is typically mechanically performed through the use of a series of rollers. Once in position, a portion of the paper stock is sheered to create one or more tab portions. The tab portion(s) may be laminated before cutting in order to provide protection and a more finished look.

Providing the tab portion(s) with this more finished look often requires that a film be provided to the paper stock or already formed tab portion, and thereafter laminated on same. In existing tabbed divider making machines, such as machines sold by Scott Office Systems LLC of Florham Park, New Jersey under the designations Scotty 5000 ("the 5,000") and Scott Ten Thousand ("the 10,000"), such film is often provided to the paper stock or tab portion by pushing the film through a tunnel or other suitably shaped guide. However, this pushing of film material sometimes results in an unwanted bending or flexing of the material, and can in certain instances, result in a jamming of the film delivery system. Such unwanted jamming can result in the loss of valuable time for the actual manufacture of tabbed dividers.

Prior tabbed divider making apparatus, like the 5,000 and the 10,000, have been very useful tools in the manufacture of tabbed dividers. Nonetheless, as with most apparatus, there is room for improvement in design and operation. For instance, the shortcomings relating to the film delivery system sometimes cause inefficiencies in the operation of the machines. In order to produce the required millions of tabbed dividers, all of the above-discussed steps have to be performed millions of times. Thus, the ease of use and efficiency of the apparatus employed are very important in producing the desired amount of tabbed dividers.

Therefore, there exists a need for an improved apparatus and method for manufacturing tabbed dividers or the like, which is both more user friendly and more efficient.

SUMMARY OF THE INVENTION

The present invention is directed to an improved tabbed divider making machine and method of making tabbed dividers. The present invention provides several unique improvements upon prior art apparatus, including one or more of the following: (1) automatic positioning and feeding of individual sheets of paper with the capability of loading paper during operation of the machine; (2) a moveable stop capable of positioning individual sheets of paper such that no further manual manipulation of the paper is required; and (3) film cartridges for providing film needed during lamination of portions of the tabbed dividers. The machine allows for the creation of both collated and non-collated sets of tabbed dividers with minimal involvement required on the part of an operator, and without requiring manipulation of paper loaded on the machine. Sheets of paper are loaded onto a feeder, from which each sheet is individually drawn into a processing section. Once on the processing section, the individual sheets are positioned and a portion of such may be laminated (this step is not required). Thereafter, the tabs are cut. Ultimately, the completed tabbed dividers are output for packaging or further manipulation. This output step is performed by an output tray, and may be done according to complete sets of dividers. The present invention improves upon prior art devices for creating tabbed dividers in both structure and operation, and provides a significant benefit to a user.

A first aspect of the present invention is a tabbed divider making apparatus capable of making tabbed dividers having differently positioned tabs from a sheet of paper. The apparatus includes a paper feeder, and a processing section adapted to receive paper from the paper feeder, the processing section including a moveable stop, a tip die, and a knife package. Interaction between the tip die, knife package, and the moveable stop allows for the making of the tabbed dividers having differently positioned tabs from a sheet of paper.

A second aspect of the present invention is a method of producing a tabbed divider including the steps of placing a sheet of paper on a paper feeder of a tabbed divider making apparatus, automatically feeding the sheet of paper to a processing section of the tabbed divider making apparatus, automatically positioning the sheet of paper on the processing section through the use of a moveable stop, automatically laminating at least a portion of the sheet of paper, automatically cutting at least a portion of the sheet of paper to create a tab, and automatically outputting the tabbed divider with an output tray.

A third aspect of the present invention provides a tabbed divider making apparatus capable of making tabbed dividers, having differently positioned tabs, from a sheet of paper. The apparatus preferably includes a paper feeder for holding a plurality of sheets of paper and feeding each sheet of paper to the remaining elements of the apparatus, a film delivery system for providing each sheet of paper with a portion of film material, the film delivery system including a source of film material, a film drive for pushing the film material, and a frictional engagement belt for pulling the film material, and a processing section adapted to receive paper from the paper feeder and create the differently positioned tabs thereon.

In certain embodiments in accordance with the third aspect, the belt is enclosed in a tunnel which includes a cover disposed over a bottom portion where the cover may be constructed of a transparent material. The tunnel may also include a u-shaped cover with the belt being disposed under the cover, wherein the belt is disposed within a channel formed in the bottom portion. The belt may include at least one aperture, and the channel formed in the bottom portion may be in fluid communication with a vacuum supply, such that suction is created through the at least one aperture. The film drive may be mechanically connected with the belt such that the film drive and the belt are mechanically timed with respect to one another. The film drive may also include two drive rollers, one of the drive rollers being connected to the belt. Moreover, the film delivery system may include a folding apparatus for folding the film material, whereby the apparatus for folding includes two folding rollers.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION

Figure 1A:
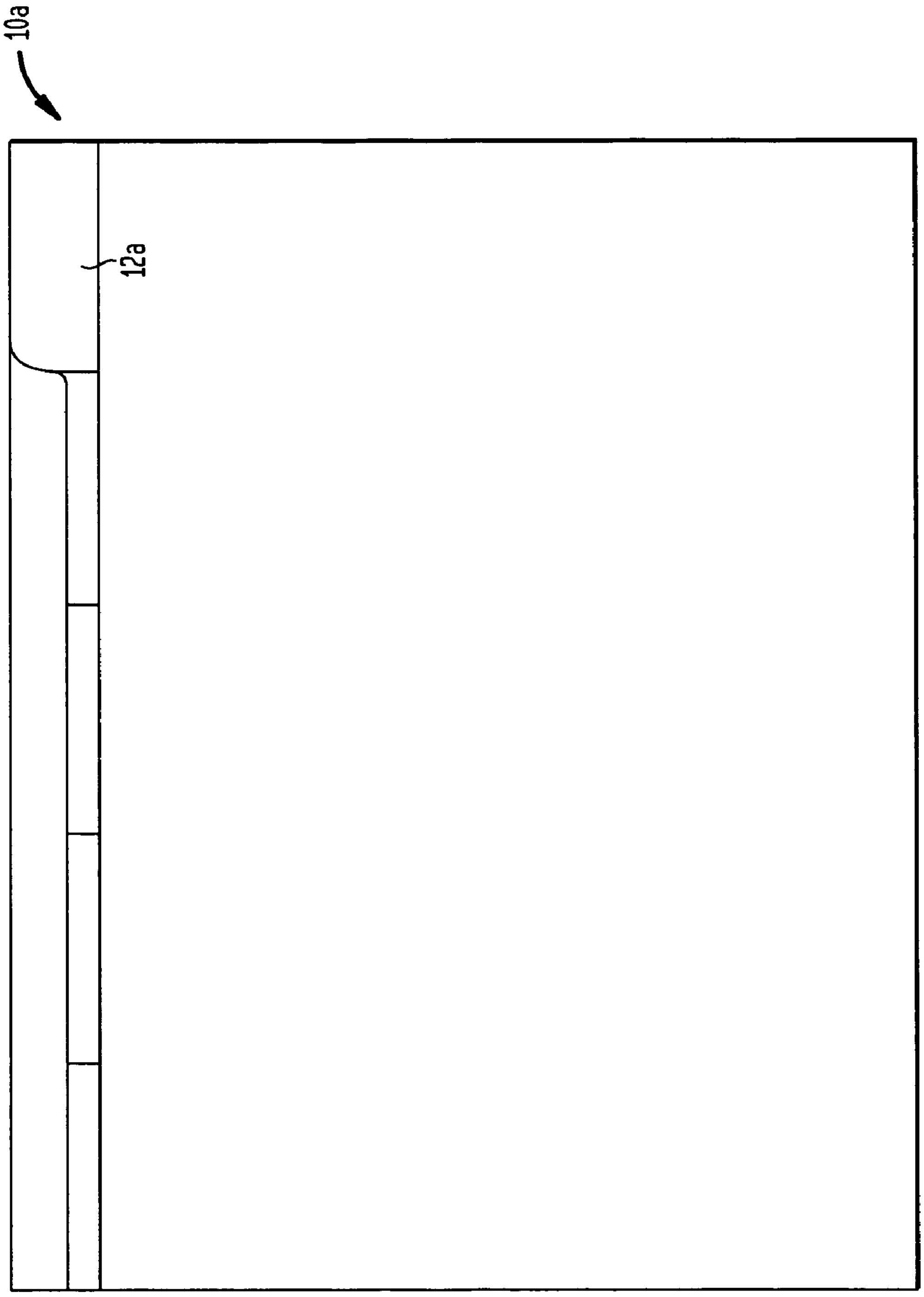
FIGS. 1A-1E are plan views of exemplary tabbed dividers having differently positioned tab portions.
Figure 1B:
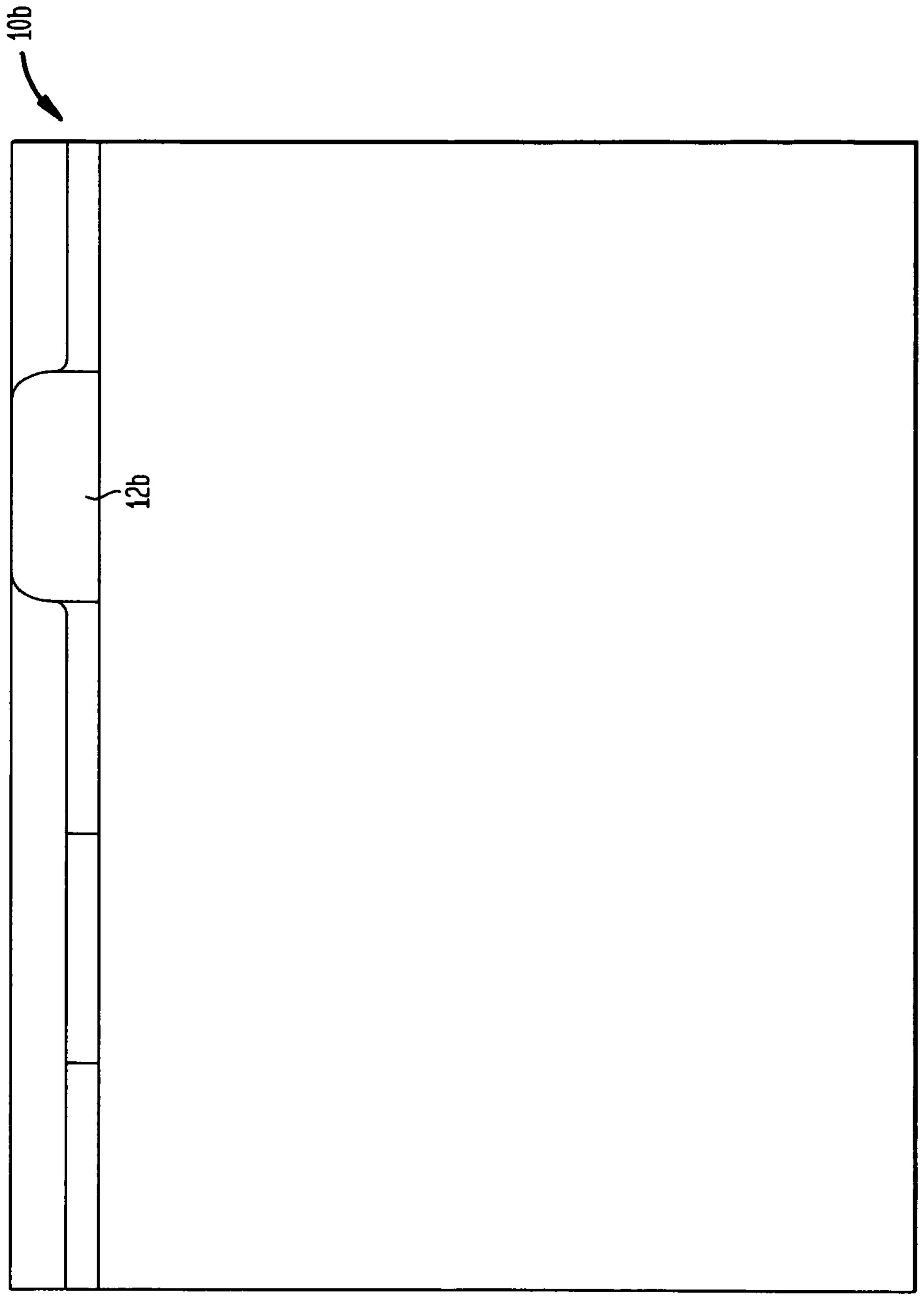
Figure 1C:
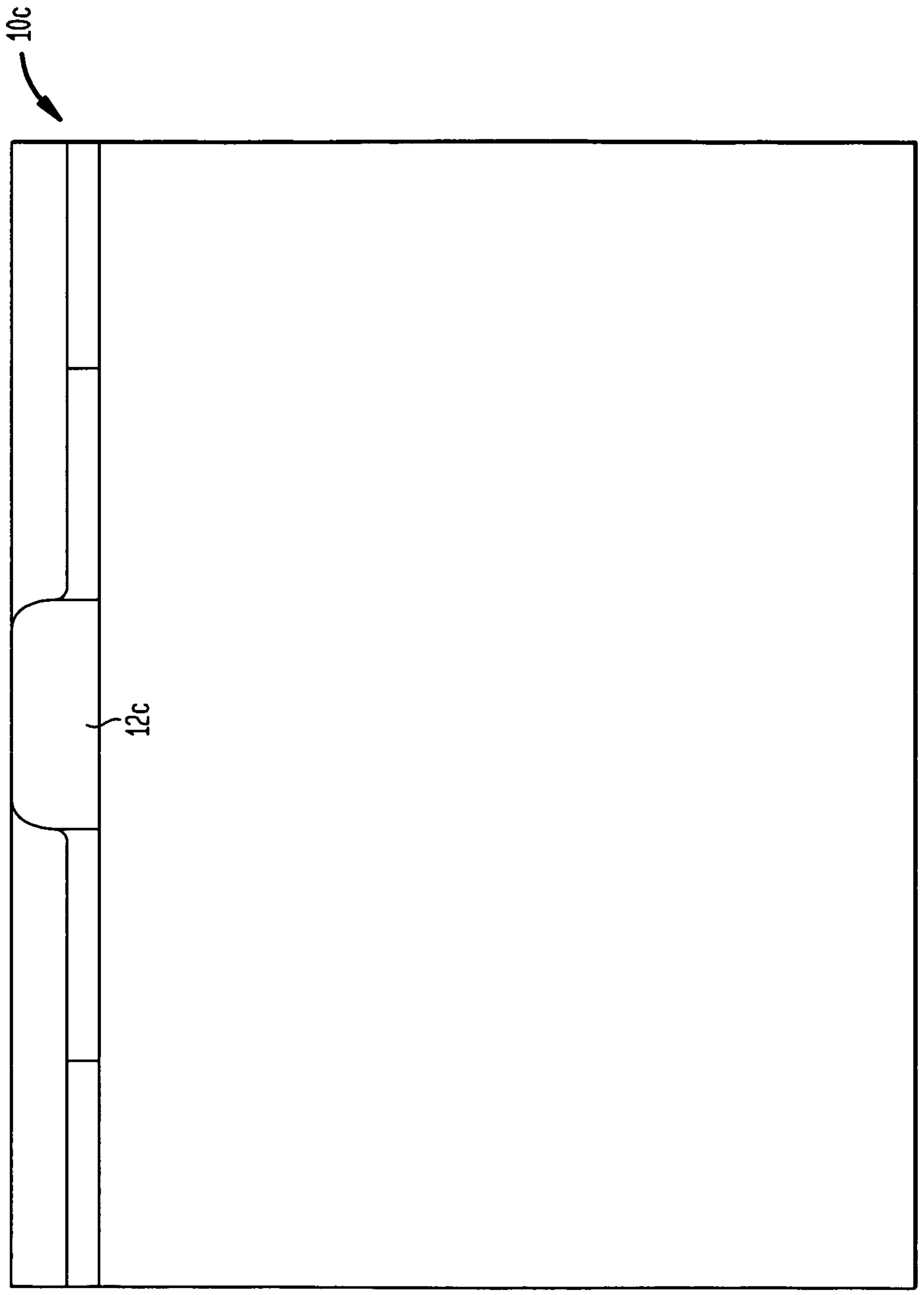
Figure 1D:
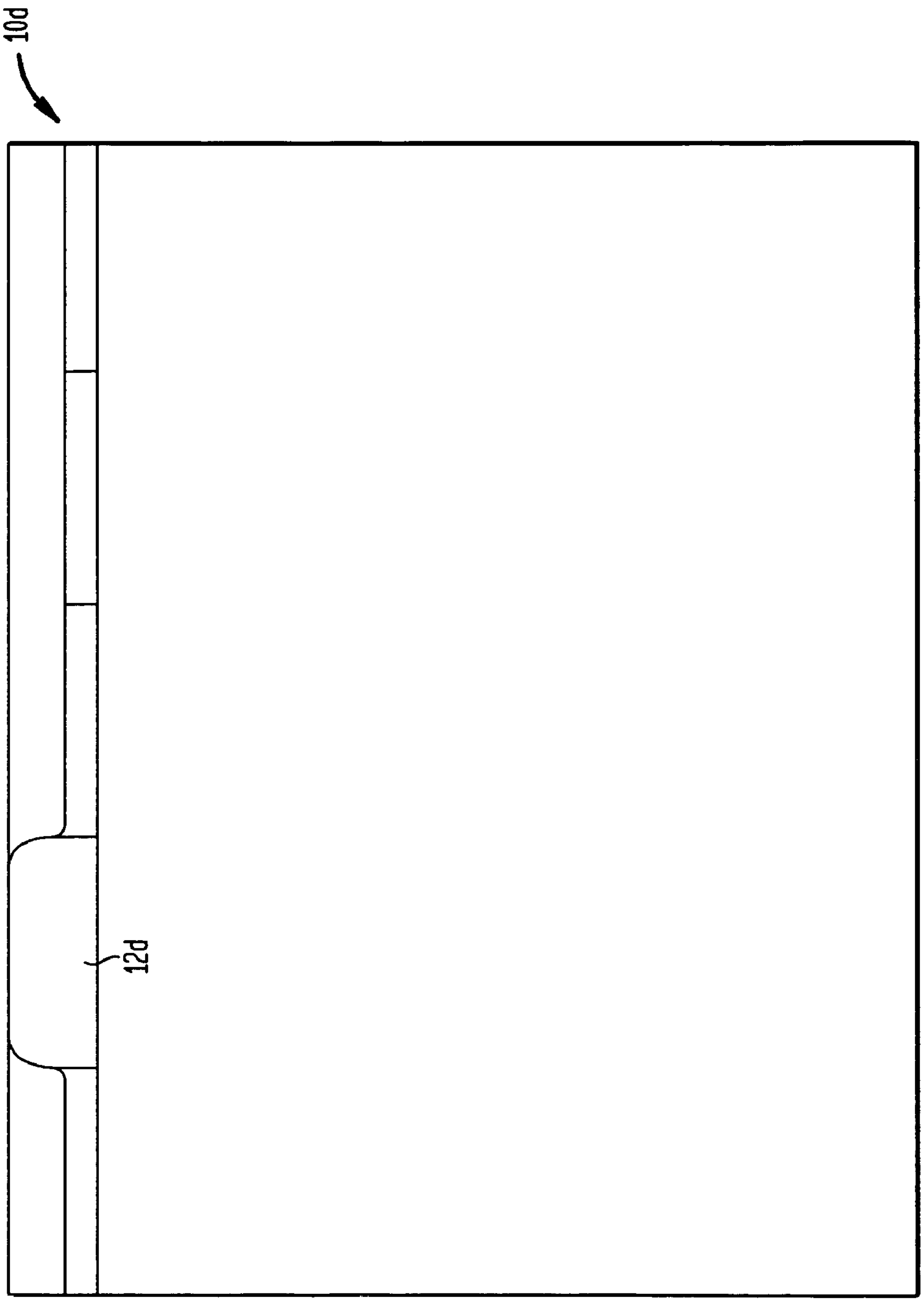
Figure 1E:
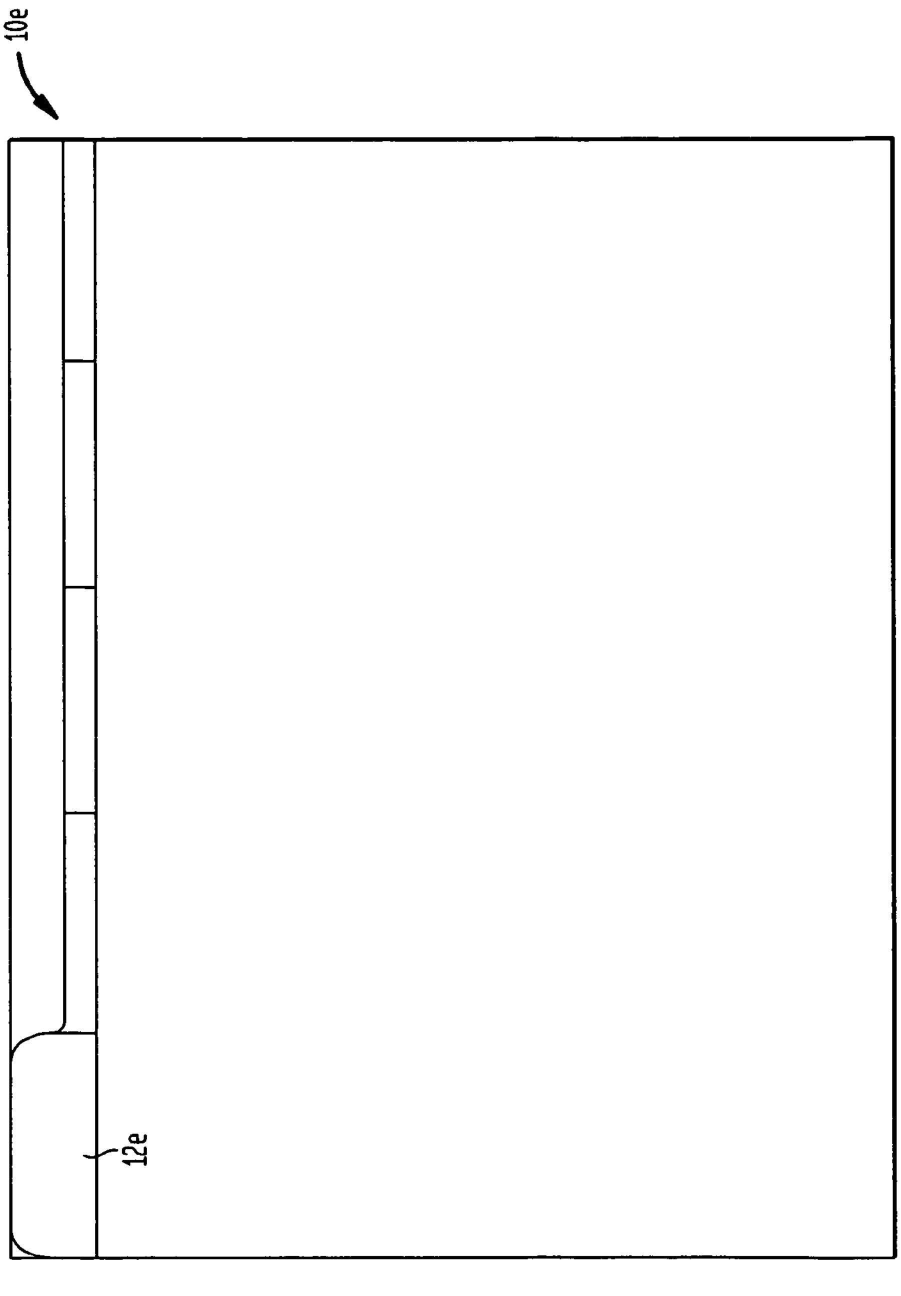

FIGS. 1A-1E depict a set of exemplary tabbed dividers 10*a*-10*e*, having tabs 12*a*-12*e*, respectively. These are exemplary dividers which could be created through the use of a machine incorporating the features of the present invention. Each divider is constructed from a single sheet of paper stock with certain portions (i.e., tabs 12*a*-12*e*) being laminated. Divider 10*a* includes tab 12*a* in a first position, divider 10*b* includes tab 12*b* in a second position, divider 10*c* includes tab 12*c* in a third position, divider 10*d* includes tab 12*d* in a fourth position and divider 10*e* includes tab 12*e* in a fifth position. In addition, each tab 12*a*-12*e* is provided with a different color and label. Dividers 10*a*-10*e* can be used, for instance, to separate different sections of a document, presentation or the like with a different divider placed in front of each section. For example, in a three ring binder, dividers 10*a*-10*e* would be punched with holes and placed in the binder so as to separate five different sections of materials housed therein. Should a sixth or further section be required, another divider 10*a* would be employed after divider 10*e*, and so on and so forth.

It is to be understood that dividers 10*a*-10*e* are merely one example of a set of dividers, and there exist many different divider configurations in the art. For instance, dividers with smaller or more tabs may be provided, and thus, a larger set can be provided. In addition, the size and shape of both the dividers themselves, as well as the tabs may be provided. Likewise, different materials may be utilized in constructing the dividers, as can different colored paper and lamination for the tabs. Whatever the case, the present invention can be utilized to create sets of dividers like dividers 10*a*-10*e*, and variations of same.

Referring to the remaining drawings, wherein like reference numerals refer to like elements, FIGS. 2-33 show a tabbed divider making apparatus or machine, designated generally as reference numeral 20, or individual aspects thereof. Although shown as a stand-alone machine, it is to be understood that machine 20 could be part of larger manufacturing equipment, and could therefore be in communication with, integrated within, or placed adjacent to other apparatus. Machine 20 markedly improves upon previously utilized machines for manufacturing tabbed dividers, such as the above-described dividers 10*a*-10*e*. Herein, certain of the aspects of machine 20 will be discussed in full, while others, which are well-known by those of ordinary skill in this art, may only be mentioned briefly.

Figure 2:
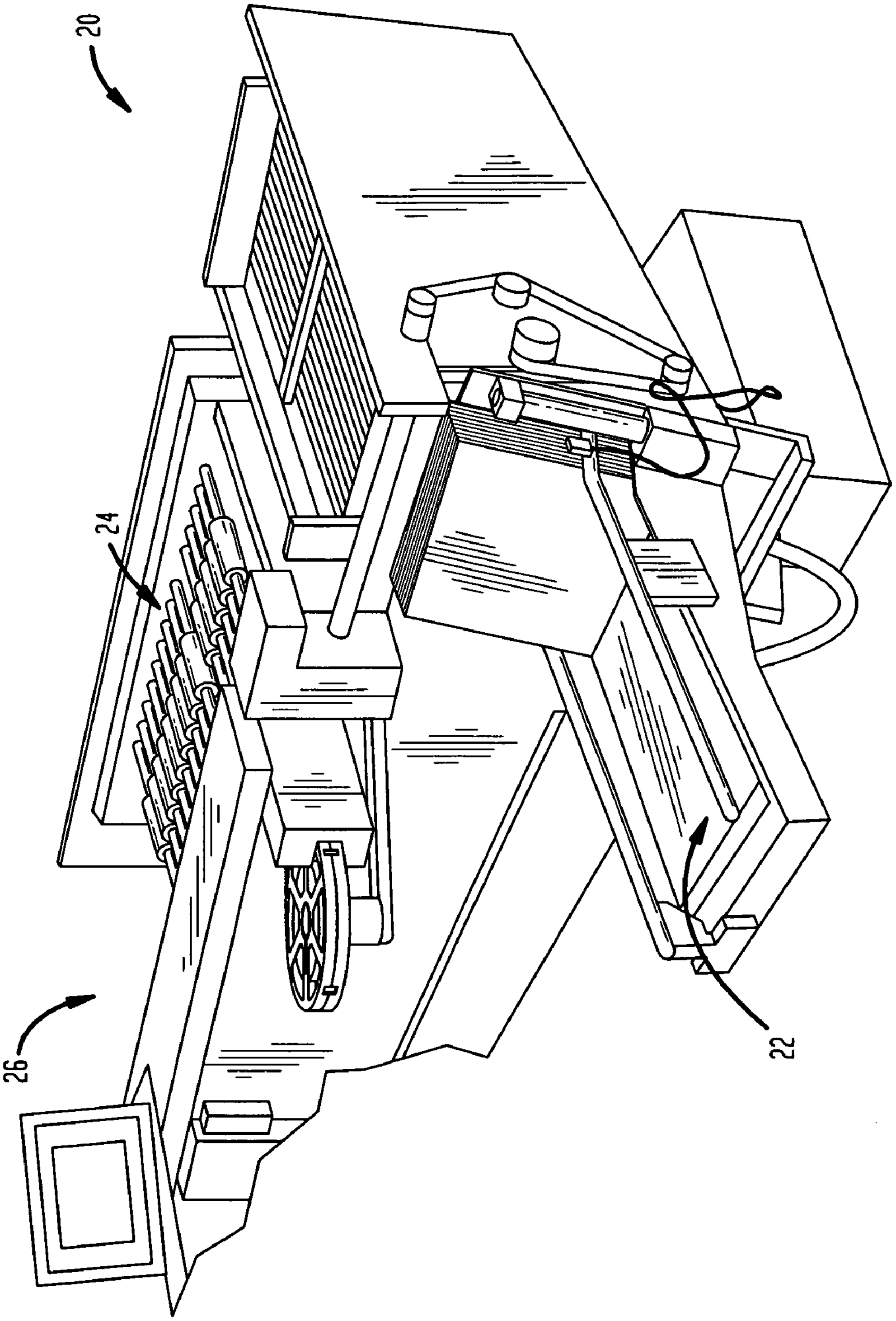
FIG. 2 is a side perspective view of a tabbed divider making apparatus in accordance with the present invention.
Figure 3:
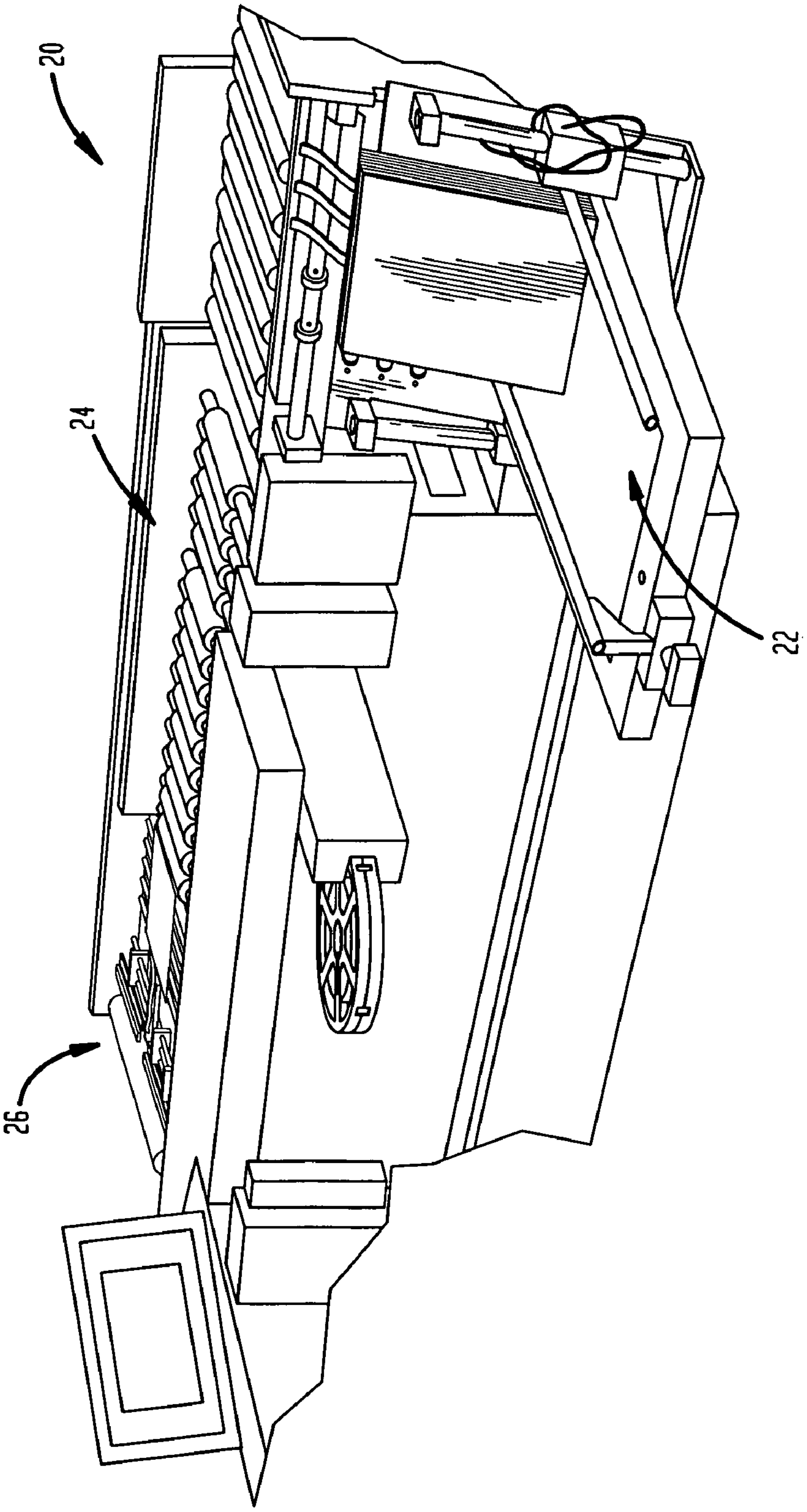
FIG. 3 is a front perspective view of the tabbed divider making apparatus shown in FIG. 2.

Machine 20 includes three main sections, namely, a paper feeder 22, a processing section 24 and an output tray 26. Views depicting machine 20 in its entirety are best shown in FIGS. 2 and 3. Paper feeder 22 operates so as to deliver paper stock to processing section 24, which in turn, operates to process the paper stock into tabbed dividers, such as exemplary dividers 10*a*-10*e*. Output tray 26 collects the finished dividers from processing section 24 and may aid in packaging, collating, or otherwise organizing such finished dividers. Each of these different sections of machine 20 will be discussed more fully below. Preferably, machine 20 provides an automated system for producing tabbed dividers, which may be easily operated by a single operator. In fact, the overall L-shaped configuration of machine 20 that is created by the positioning of paper feeder 22, processing section 24 and output tray 26 with respect to one another, creates a setting that requires minimal movement on the part of an operator during operation. For example, an operator can generally operate machine 20 while standing on one side thereof, without the need for moving around the machine. It is to be understood that the preferred L-shaped configuration shown in the figures is but one layout for machine 20, and others may easily be employed without straying from the aim of the present invention. For instance, a U-shaped configuration could be provided with output tray 26 extending from processing section 24 in a similar fashion that paper feeder 22 does.

Paper feeder 22 is more particularly shown in FIGS. 4-7. In the embodiment shown in those figures, paper feeder 22 includes a main body 30 capable of moving with respect to processing section 24 and certain other elements of machine 20, a conveyor belt 32 operable on main body 30, a fixed arm 34 fixed with respect to main body 30, a movable arm 36 movable with respect to main body 30, and a vertical roller structure 38 (best shown in FIGS. 6 and 7). These different components preferably allow paper feeder 22 to feed differently sized paper or paper stock to processing section 24. For instance, main body 30 is designed to be moveable in a vertical direction in order to allow for paper of different lengths to be fed into the remaining sections of machine 20.

Figure 4:
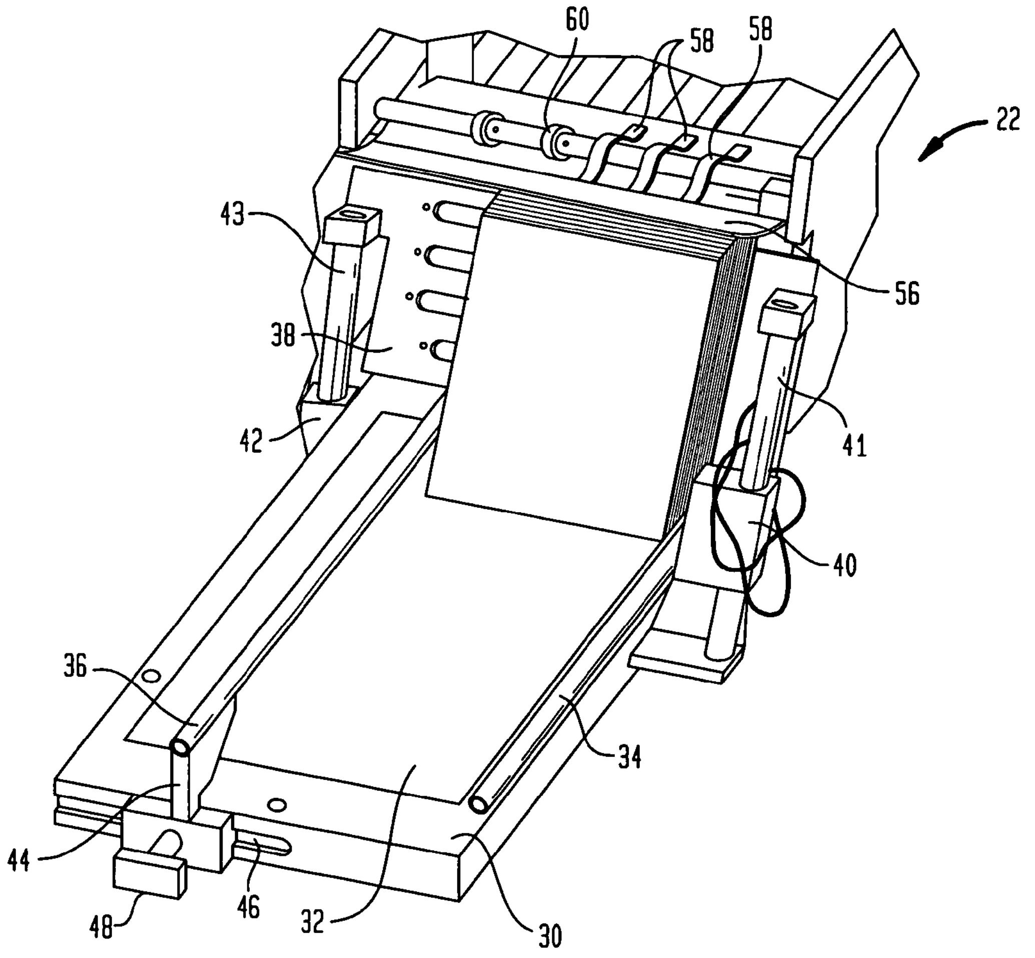
FIG. 4 is a front perspective view of the tabbed divider making apparatus shown in FIG. 2, with attention to a paper feeder.
Figure 5:
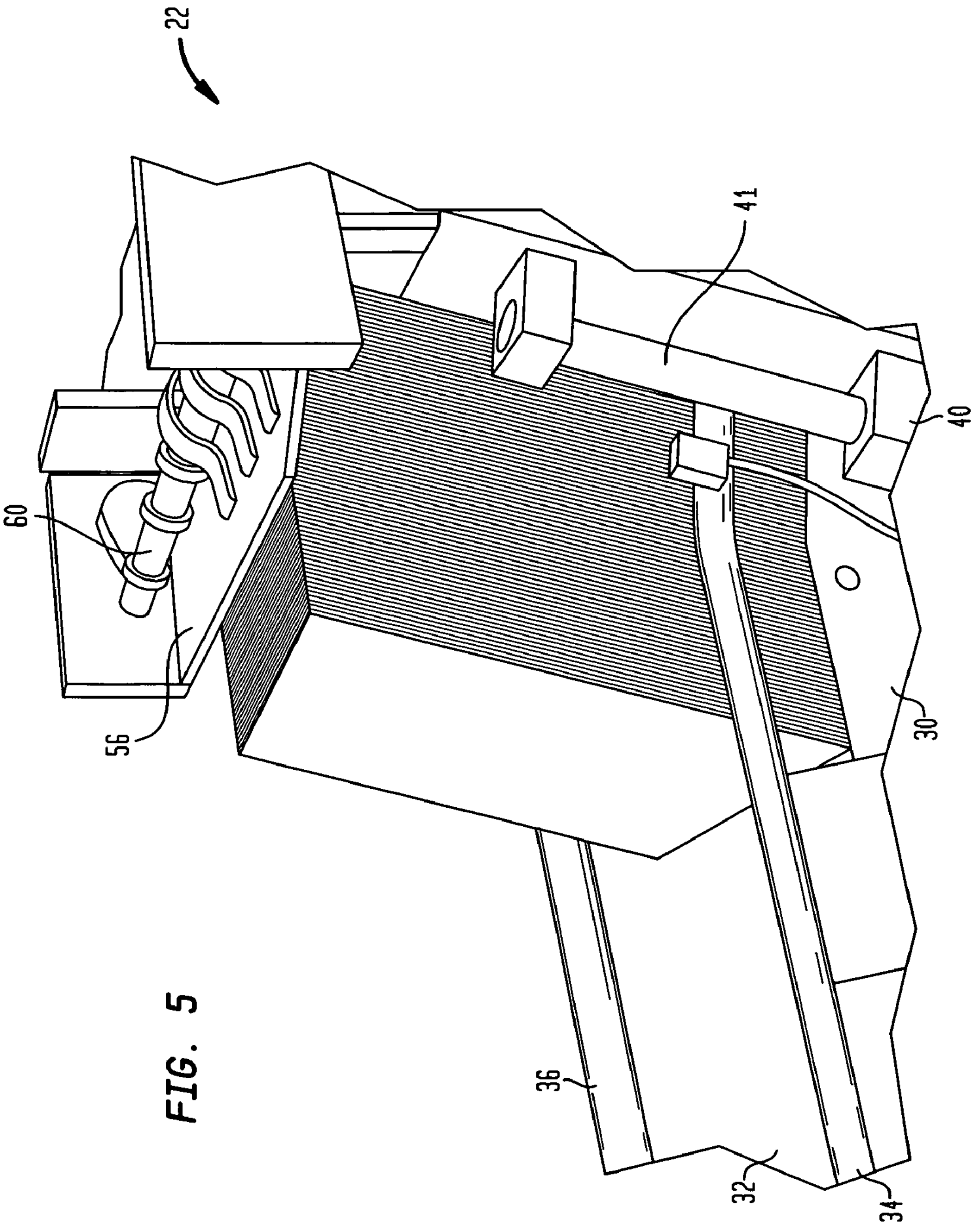
FIG. 5 is a side perspective view of the paper feeder shown in FIG. 4.
Figure 6:
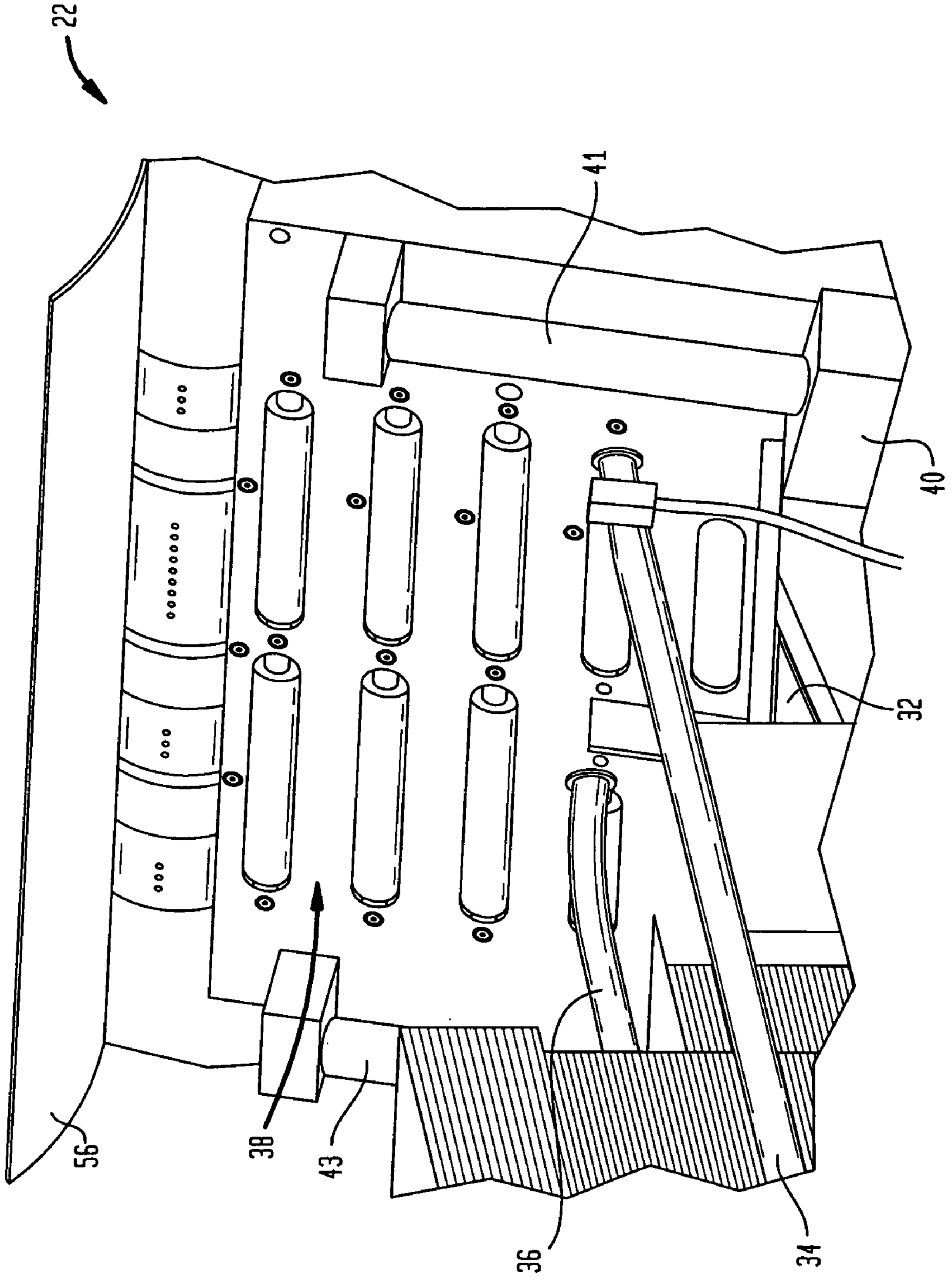
FIG. 6 is a front perspective view of the paper feeder shown in FIGS. 4 and 5 with paper removed therefrom.

The mechanism enabling body 30 to move up and down in the vertical direction is best illustrated in FIGS. 4-6. Main body 30 includes two hollowed extensions 40 and 42 which are designed to receive and move along poles 41 and 43, respectively. A hand crank or other manually operable mechanism (not shown) is also provided for causing the body 30 to move up and down in accordance with the path created by poles 41 and 43. Thus, for longer paper, body 30 may be positioned at a lower height with respect to the other components of machine 20, and for shorter paper, body 30 may positioned at a higher height with respect to the other components of machine 20. This allows the top edges of the paper to properly align with roller structure 38. It is to be understood that rather than manual movement of main body 30, automated movement of same may be incorporated into the design of paper feeder 22. In this regard, a transmission and motor, or other like structure, could be employed to cause the movement of main body 30.

Similarly, moveable arm 36 is provided in order to allow feeder 22 to receive paper of different widths. As is best shown in FIG. 4, moveable arm 36 includes an extension 44 capable of engaging and moving along a slot 46 formed in body 30. Moveable arm 36 also includes a locking knob 48 that, when tightened, locks extension 44 within slot 46, and thusly, fixes moveable arm 36 in position. Extension 44 may be many different shapes and sizes and may be configured to fit within many differently configured and shaped slots 46. Knob 48 is preferably a set screw tightened device that may be rotated, by hand or through the use of a tool, in order to lock/unlock moveable arm 36 in position.

In operation, an operator may first loosen knob 48 and thereafter slide moveable arm 36 into a position which allows paper to be placed between arms 34 and 36. In order to ensure proper spacing between the arms, paper may be abutted up against fixed arm 34, such that it is positioned in accordance with normal operation. Moveable arm 36 may then be slid up against the paper and knob 48 may be tightened in order to lock the arm in place. This is an easy method for an operator to undertake during normal operation. Like in the above-discussion relating to the movement of main body 30, moveable arm 36 could also be capable of automatic movement, in a similar fashion.

Body 30 also includes conveyor belt 32 which is situated such that a stack of paper may be held at a vertical angle to feed paper from the bottom of the stack in a first on, first off ("FIFO") manner. Thus, paper may be replenished during operation (i.e., while both feeder 22 and processing section 24 are operating to create tabbed dividers) before paper is completely exhausted. This vertical angle may include certain changes in angle as best shown in FIG. 5 in which paper closer to processing section 24 is angled in a downward fashion. This ensures uniform feeding of paper without fouling by utilizing natural gravity forces. The overall length of body 30 also dictates how much paper may be held. In alternate embodiments, this length may allow for a significant amount of paper to be held, and thus, replenishing steps taken by an operator may be few and far between. It is also to be understood that conveyor belt 32 is preferably constructed so as to frictionally engage the paper placed thereon. This may require materials, such as rubber or the like, to be utilized and/or could require friction causing structures to be placed on belt 32. Given the speed at which the remaining components of machine 20 operate at, conveyor belt 32 may continuously run in order to provide a uniform stream of paper during operation.

Figure 7:
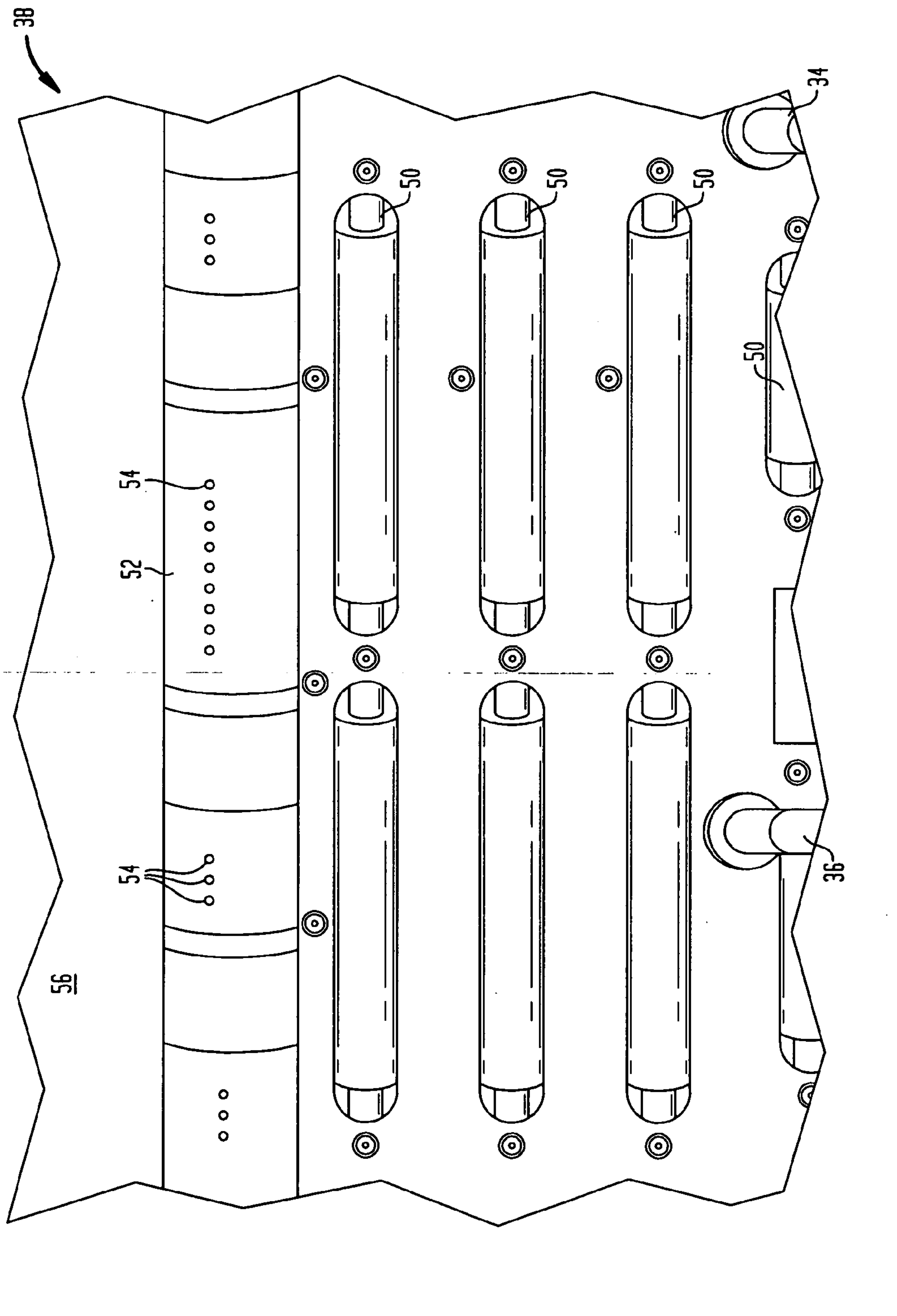
FIG. 7 is an enlarged front plan view of a roller structure of the paper feeder shown in FIGS. 4-6.

Vertical roller structure 38, as is best shown in FIG. 7, preferably operates so as to move paper from feeder 22 to processing section 24. In accordance with the FIFO operation of feeder 22, the first paper loaded on feeder 22 is the first paper sent to processing section 24. Because of the positioning and configuration of feeder 22, this operation requires that the paper be moved in a vertical direction from its positioning on feeder 22, and finish in a horizontal orientation on processing section 24. In order to accomplish this, roller structure 38 includes a plurality of solid idling rollers 50, and at least one hollow roller 52, which is preferably provided with a plurality of holes 54. In operation, the combination of the weight of the paper stack being pushed by conveyor belt 32 towards roller structure 38 and the tackiness provided by roller 52 causes friction between the paper and at least roller 52. In this regard, rollers 50 are preferably formed of a material suitable for providing the needed friction, such as rubber. Hollow roller 52 preferably oscillated, without completely rotating, while at the same time providing a vacuum through holes 54. The vacuum is preferably provided by a vacuum pump, an air compressor, or the like (not shown), which may also be utilized in other aspects of machine 20. Idling rollers 50 are preferably capable of fully rotating, thereby allowing the paper to move smoothly across same. In whole, this operation causes the paper to move from feeder 22 to processing section 24.

A diverter 56 is also provided to aid in causing the aforementioned change in orientation of each individual sheet of paper. Diverter 56 (best depicted in FIGS. 5 and 6) is a sheet of metal or other rigid material which extends from processing section 24, over roller structure 38 and towards feeder 22. As is best shown in FIG. 5, diverter 56 may include an angled section, and is preferably connected to a portion of machine 20. One or more resilient members 58, such as spring-like members, are also provided to keep diverter biased towards feeder 22. Upon movement of a sheet of paper from feeder 22 towards processing section 24 by roller structure 38, the sheet of paper is caused to pass under diverter 58. This creates the change in orientation, with the sheet of paper ultimately being positioned in a horizontal fashion on processing section 24. Another roller 60 (shown in FIGS. 4, 5 and 8) may also be provided to ensure the smooth transition of paper from feeder 22 to processing section 24. From this horizontal position, the remaining steps in creating a tabbed divider, such as dividers 10*a*-10*e*, may be performed.

Figure 8:
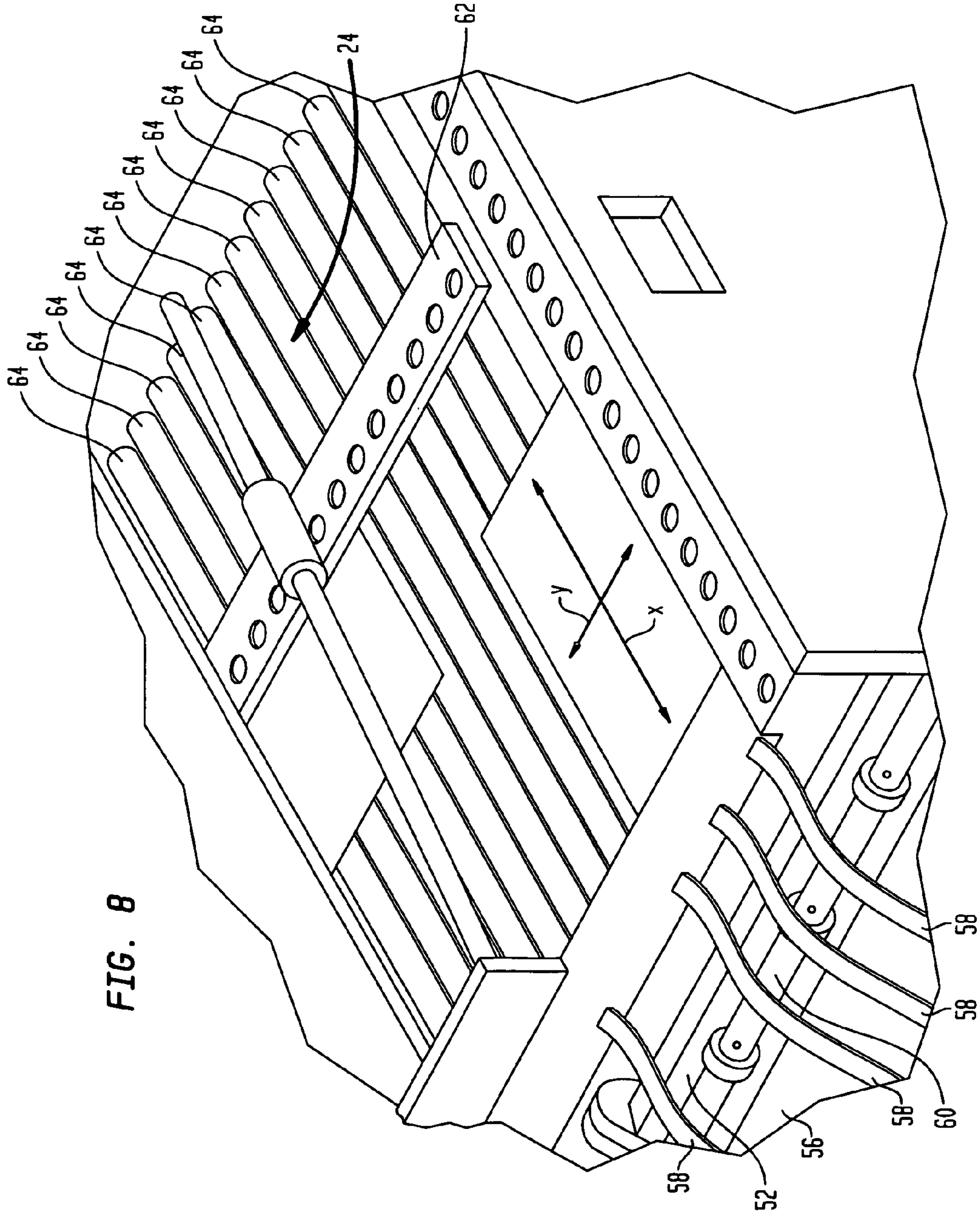
FIG. 8 is a top perspective view of the tabbed divider making apparatus shown in FIG. 2, with attention to a moveable stop.

It is to be understood that the operation of roller structure 38 and roller 60 preferably causes each individual sheet of paper to enter processing section 24 with some momentum. In other words, each sheet of paper is provided with enough force by roller structure 38 and roller 60 so as to still be moving upon entrance into section 24. In fact, each sheet of paper preferably continues to move until it engages a moveable stop 62 provided on processing section 24. Moveable stop 62 is capable of moving in a direction noted by arrow X in FIG. 8. This movement may be facilitated through the fact that stop 62 includes roller bearing or wheel structures (not shown) that allow the component to move with respect to section 24. The use of a transmission and motor set up (also not shown) may be employed to cause the movement. It is to be understood that this movement is preferably provided in response to a computer or automated control of machine 20. The movement of stop 62 preferably dictates the positioning of a tab, like tabs 12*a*-12*e* of dividers 10*a*-10*e*, to be formed on the sheet of paper. This will be discussed more fully below. It is noted that FIG. 8 illustrates two pieces of paper situated in different orientations, with the lower paper situated in a preferred orientation.

Figure 9:
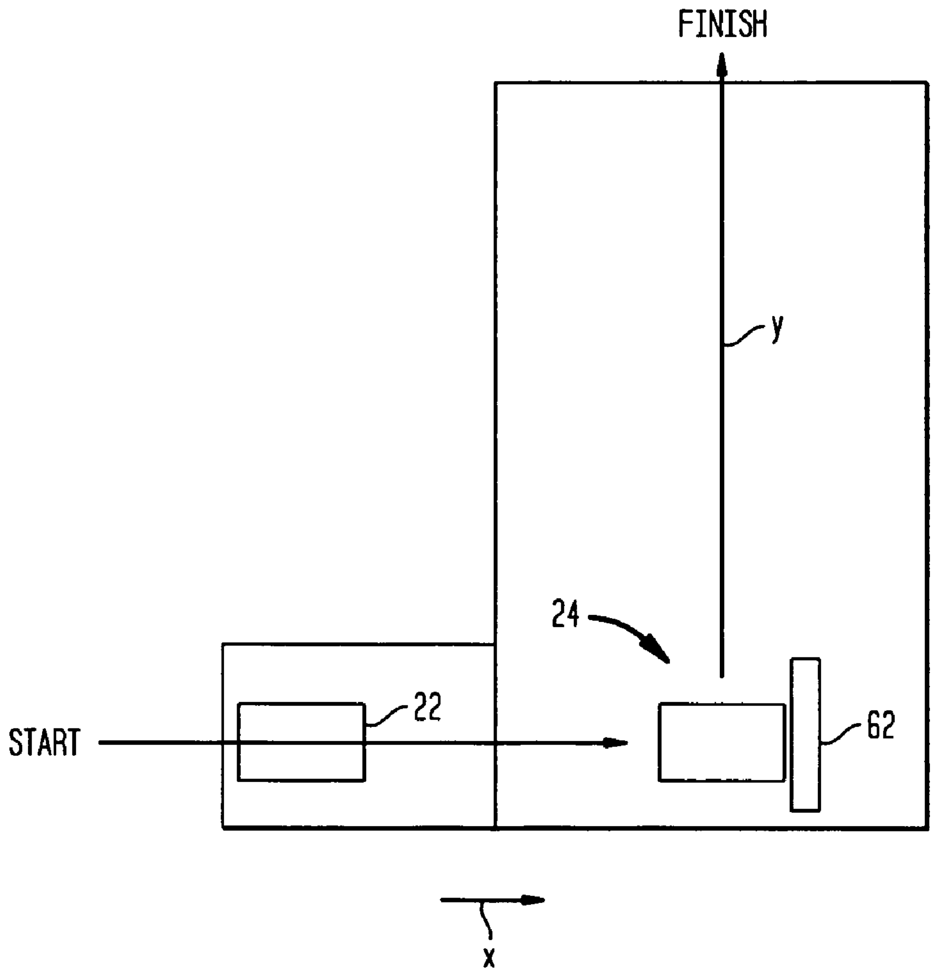
FIG. 9 is a diagrammatical top plan view of the tabbed divider making apparatus shown in FIG. 2, depicting the basic progression of a piece of paper stock during operation of the apparatus.
Figure 10:
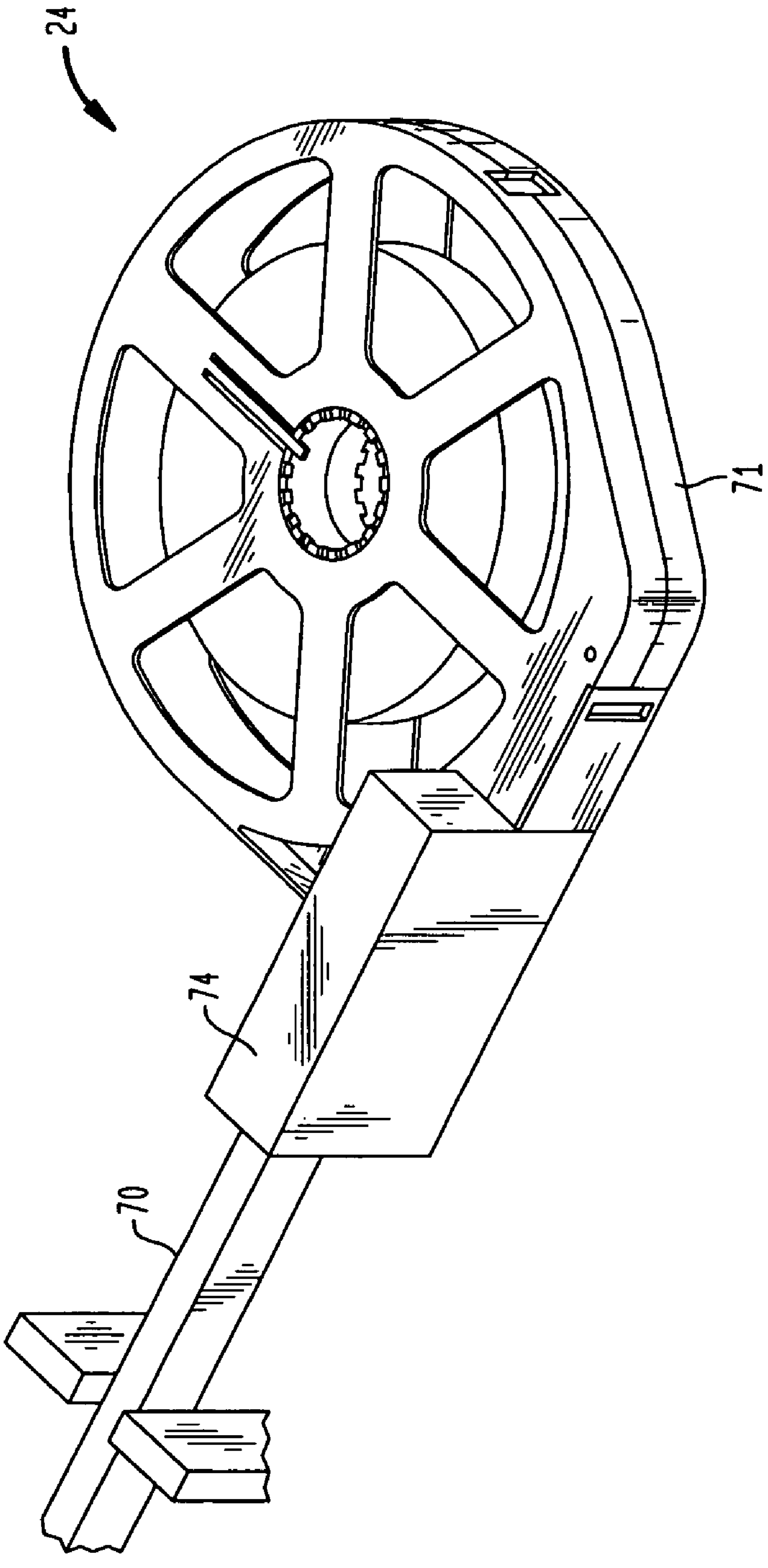
FIG. 10 is a top perspective view of a first film cartridge connected to the tabbed divider making apparatus shown in FIG. 2.
Figure 11:
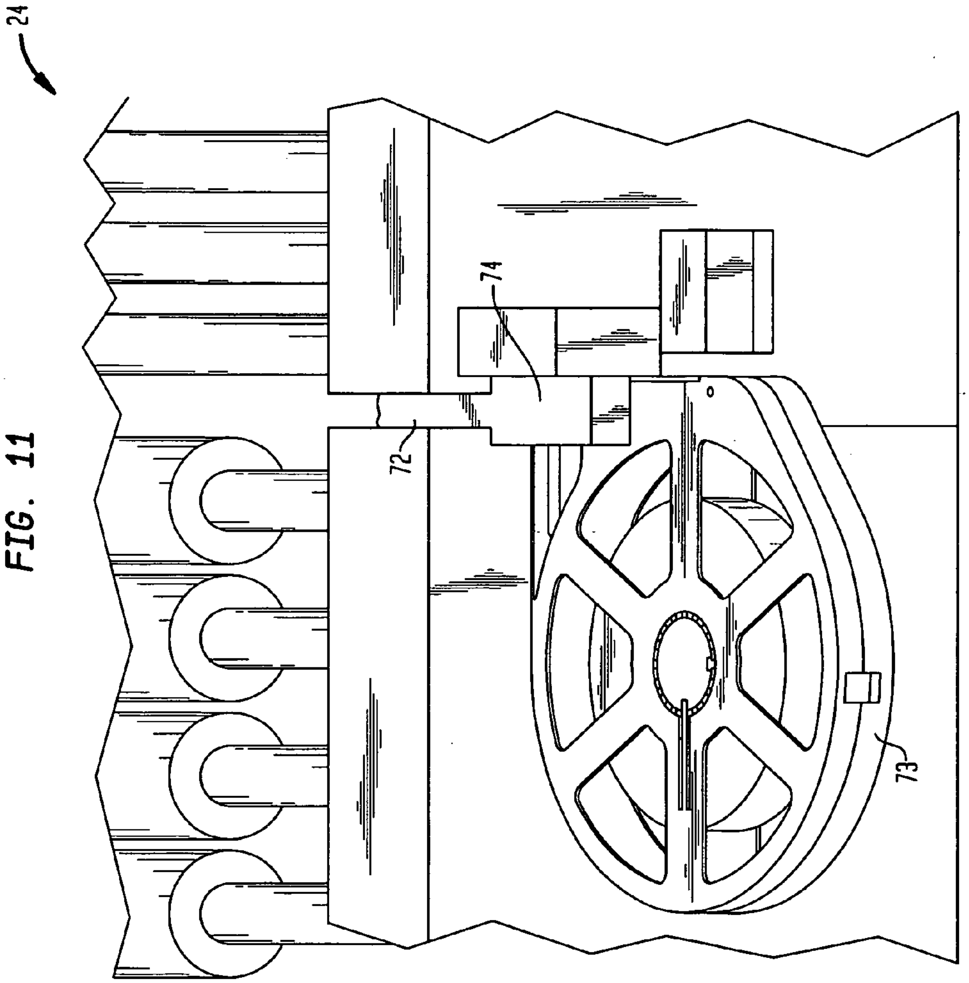
FIG. 11 is a top perspective view of a second film cartridge connected to the tabbed divider making apparatus shown in FIG. 2.
Figure 12:
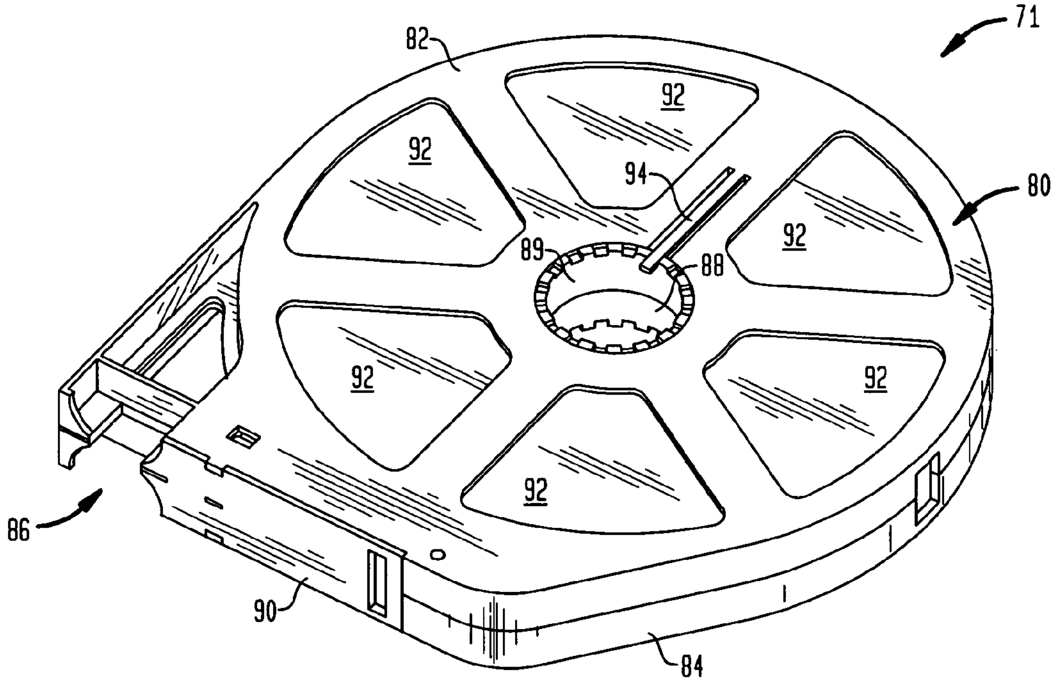
FIG. 12 is a top perspective view of an exemplary film cartridge for use in connection with the present invention.
Figure 13:
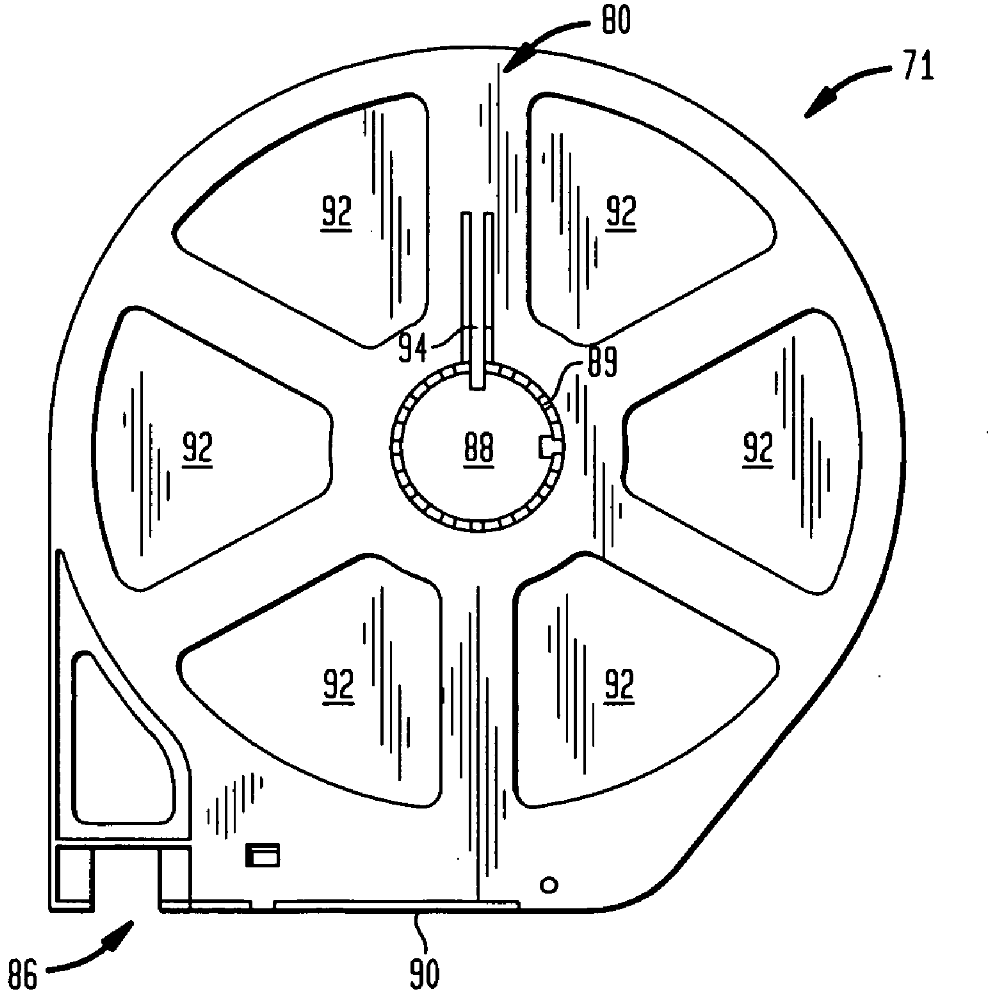
FIG. 13 is a top plan view of the film cartridge shown in FIG. 12.
Figure 14:
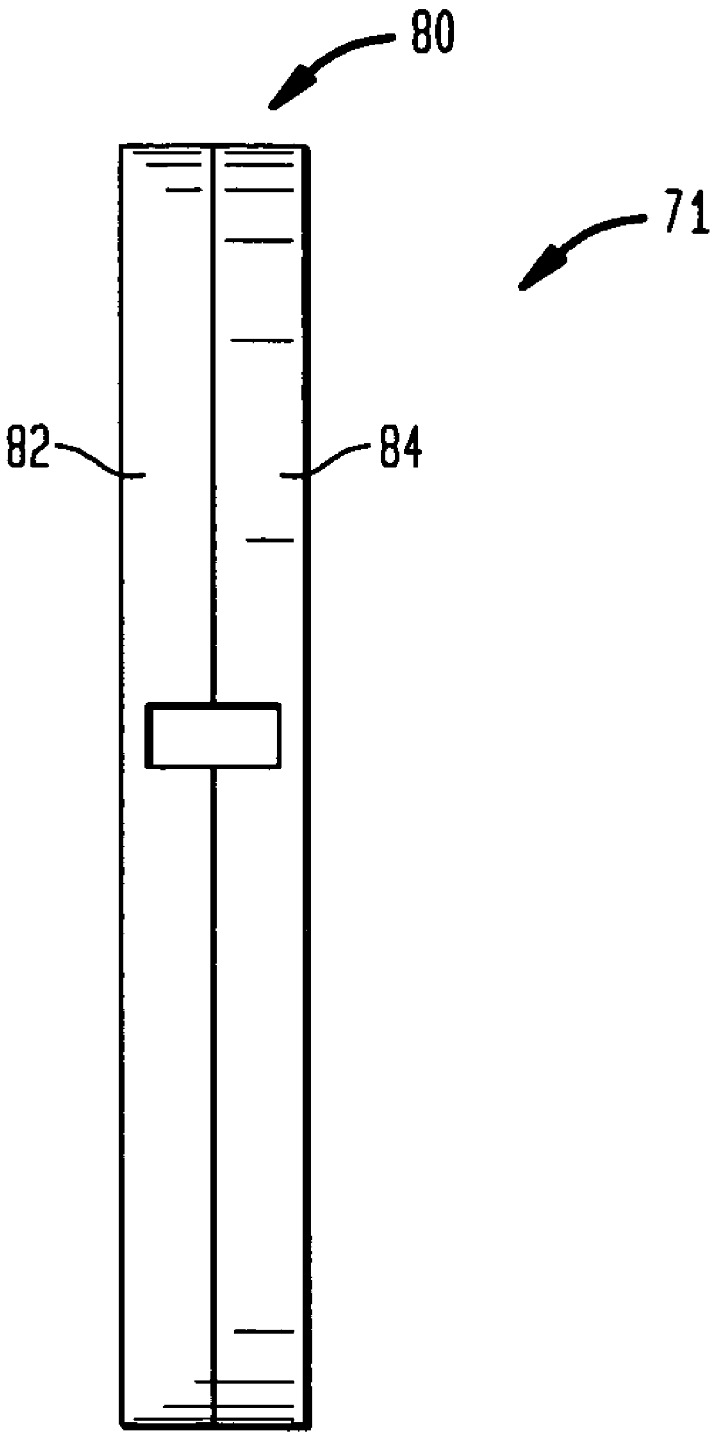
FIG. 14 is side plan view of the film cartridge shown in FIG. 12.
Figure 15:
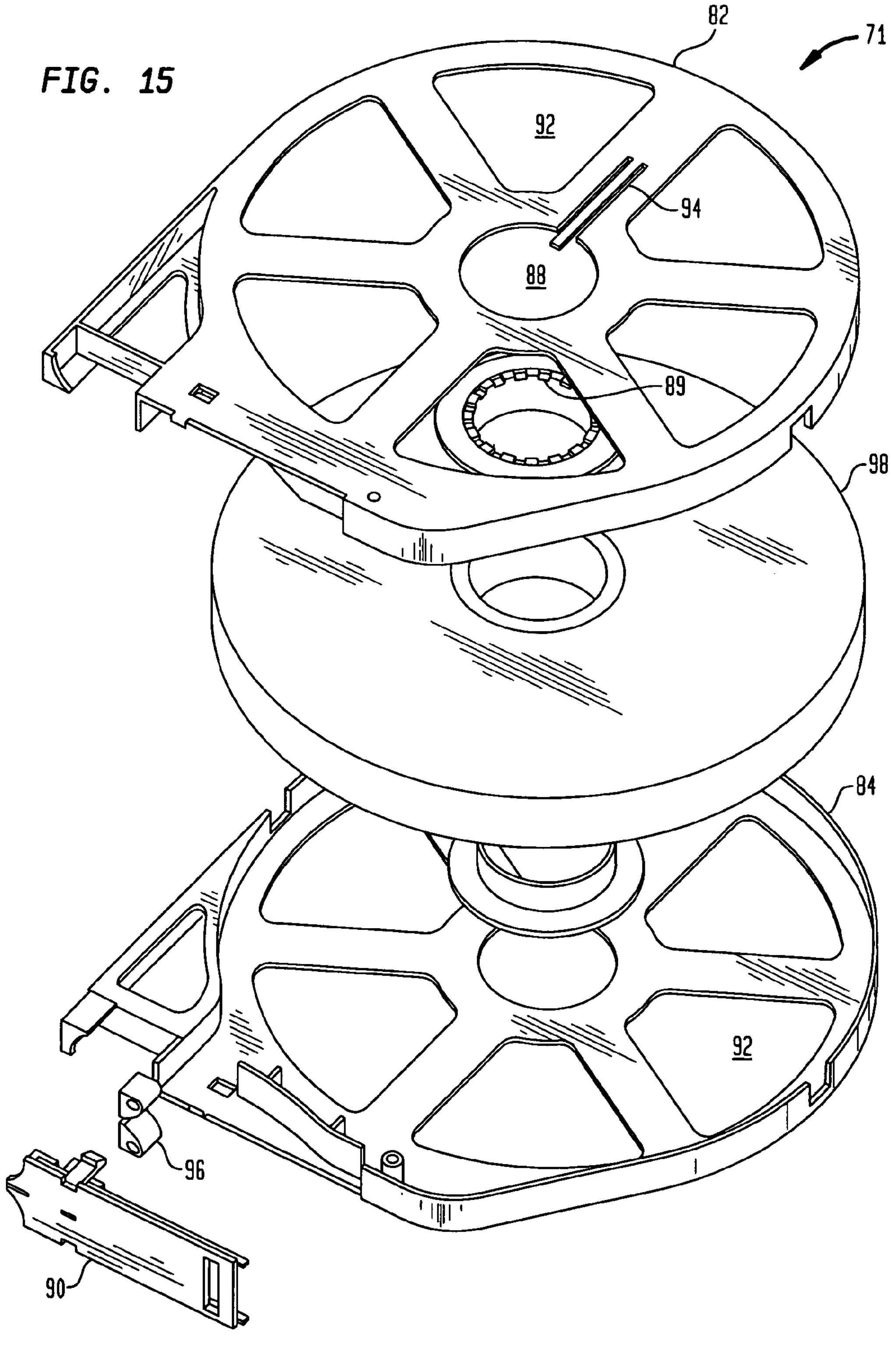
FIG. 15 is an exploded view depicting the various components of the film cartridge shown in FIG. 12.
Figure 16:
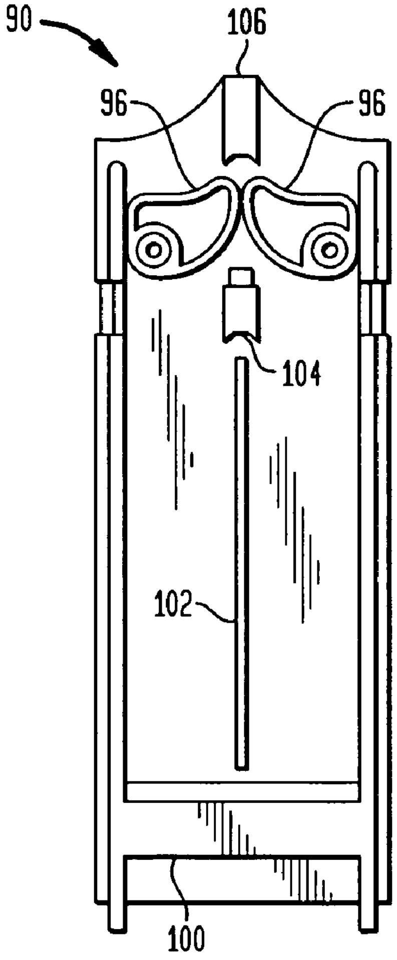
FIG. 16 is a front view of a fold plate assembly for use with the film cartridge shown in FIG. 12.
Figure 17:
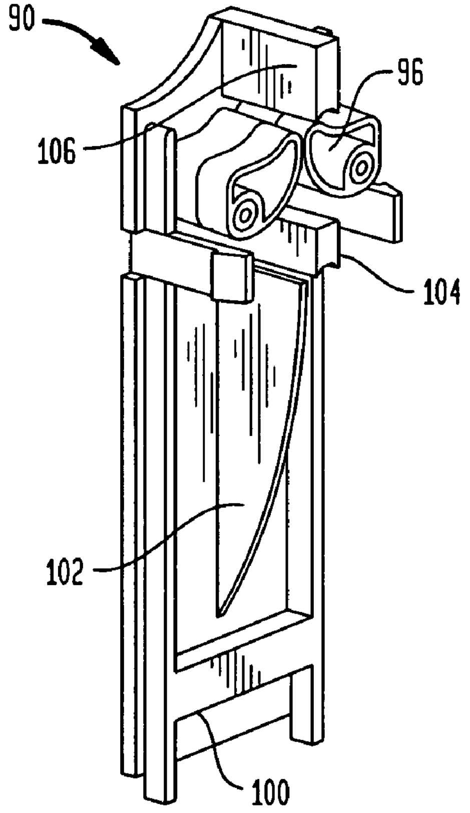
FIG. 17 is a top perspective view of the fold plate assembly of FIG. 16.

FIG. 9 illustrates the transition of a sheet of paper between feeder 22 to processing section 24. The depiction of the sheet of paper situated in feeder 22 shows the sheet in a horizontal orientation for illustrative purposes. As is made clear above, sheets of paper in feeder 22 would likely be in a vertical orientation. Once a sheet of paper engages moveable stop 62, rotating rollers 64 (shown in FIG. 8) in the first section of processing section 24 cause the sheet of paper to move in a direction depicted by arrow Y in FIGS. 8 and 9. Rollers 64 are preferably slightly angled with respect to machine 20 so as to cause the sheet of paper to remain abutted against stop 62 during transport. Rollers 64 may be synched in rotation with one another, or could simply rotate independently of one another. Similarly, a single motor and transmission (not shown) may be provided to drive the rotation of rollers 64, or only certain of the rollers. Preferably, rotation of rollers 64 is automatically controlled by machine 20 and capable of being conducted at varying speeds.

Each individual sheet of paper is fed (by rollers 64) into a section of processing section 24 in which the sheet is provided with film material necessary for lamination of the tab. In order to provide the material for lamination, processing section 24 may include tubes 70 and 72 (shown in FIGS. 10 and 11, respectively) which are fed with material by a first film cartridge 71 and a second film cartridge 73, respectively. Tubes 70 and 72 are preferably sized and configured so as to allow movement of a film therethrough and may include mechanisms for guiding and moving such film through each tube. It is to be understood that the present invention preferably provides for self-registering of the film. In other words, upon engagement of a cartridge with machine 20, film is automatically fed into either tube 70 or 72. A sensor (not shown) in each tube is preferably provided to detect the film and cause same to be moved into position for use. In addition, tubes 70 and 72 each include a cartridge interface 74 for engaging film cartridges 71 and 73. This interface preferably cooperates with cartridges 71 and 73 so as to allow easy insertion and removal of the cartridges by an operator. Many different interface 74 constructions may be utilized, as dictated by the particular cartridge 71 and 73 structure being employed. It is to be understood that other film holding/delivery mechanisms may be incorporated into the machine. Such may or may not involve the use of cartridges or the like.

With regard to cartridges 71 and 73, FIGS. 12-17 depict such components more fully. Each cartridge 71 or 73 (labeled in the figures with reference numeral 71) preferably includes a main body 80 having two halves 82 and 84, which define an opening interface 86 for engaging interface 74. Further, each cartridge 71 and 73 includes a central opening 88 having a hub 89 disposed therein, a fold plate 90, one or more cutouts 92 located on halves 82 and/or 84, a hub locking bar 94 located on halve 82, and an anti-backfeed finger 96. Each cartridge is preferably designed so as to house a roll of film 98, and allow same to be dispensed or fed therefrom. In operation, the aforementioned tubes 70 and 72 operate so as to feed film from roll 98 to a sheet of paper to be laminated. Hub 89 is preferably caused to rotate during this operation so as to, in turn, cause the film to uniformly come off of roll 98. Hub locking bar 94 ensures that hub 89 and roll 98 do not rotate while not in use. Anti-backfeed fingers 96 (see FIGS. 16 and 17) are provided to prevent film from rolling back onto roll 98, as will be discussed more fully below in connection with fold plate 90. All the while, an operator can be made aware of the amount of film material left on roll 98 by viewing same through the one or more cutouts 92. In certain embodiments, an auto-tension hub (not shown) may be provided on machine 20. This may allow each cartridge to be mounted thereon and could act to further prevent breakage, slippage and/or other problems during feeding of film into the machine.

Preferably, film is delivered through tubes 70 and 72 in a folded or semi-folded fashion, such that a folded amount of film can be fit over each side of a tab portion prior to being laminated. The mechanism for facilitating the folding of the film includes fold plate 90, which is better shown in FIGS. 16 and 17. Plate 90 includes a film threading slot 100, a film folding rib 102, a film creasing tunnel 104 and a film exit tunnel 106. In addition, anti-backfeed fingers 96 are mounted on plate 90 between tunnels 104 and 106. In operation, film being pulled from roll 98 is first fed through slot 100, so as to have the film properly positioned throughout its passage through the other elements of plate 90. Then, the film is guided across a gradually increasing rib 102, which provides a crease in the film material. Tunnels 104 and 106 accept this creased material and reinforce the crease so that material ultimately expelled from cartridges 71 and 73 is fully folded over on itself. Anti-backfeed fingers 96 are provided so as to prevent film being pulled through the various elements of plate 90 from backing up. Essentially, fingers 96 include two portions which are biased towards one another and only allow motion of a folded film material in one direction. It is to be understood that the various elements of plate 90 may vary depending upon the size and/or configuration of the film held on roll 98. For example, depending upon the size of the film, tunnels 104 and 106 may need to be sized accordingly.

With the film material being fed through tubes 70 and 72 being in a folded state, such is preferably applied to an edge, or a portion of an edge, of each sheet of paper moving through machine 20. It is to be understood that either tube 70 and cartridge 71 or tube 72 and cartridge 73 are utilized to provide material for lamination of a given sheet. In fact, one or the other of these tube and cartridge combination may be utilized for differently situated tabs. For instance, tabs to be formed on one end of a sheet of paper may receive film from tube 70 and cartridge 71, while tabs formed on the other end may receive film from tube 72 and cartridge 73. Those of ordinary skill in the art would readily recognize the various possibilities in this regard.

Figure 18:
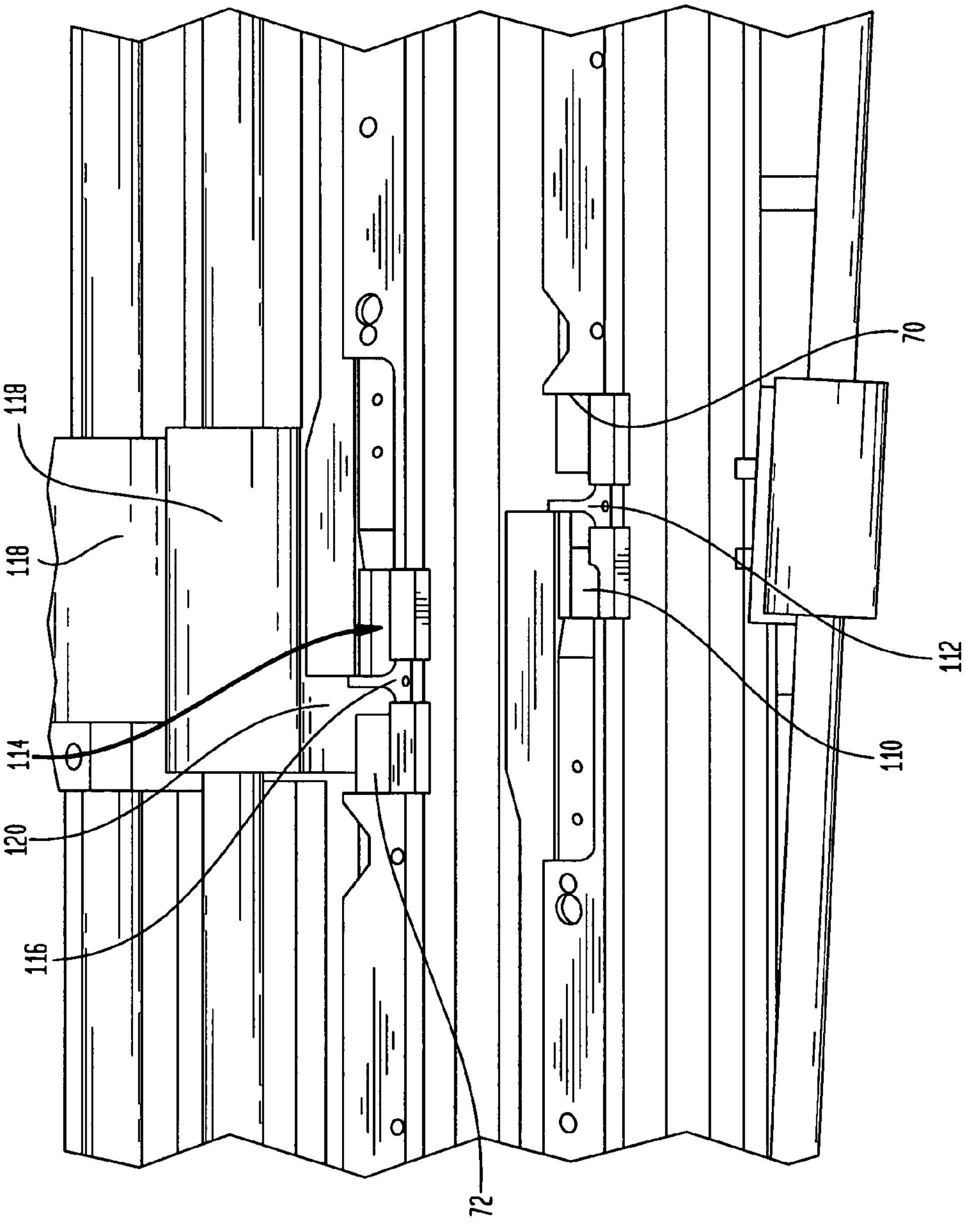
FIG. 18 is a top perspective view of the tabbed divider making apparatus of shown in FIG. 2, with attention to two tip die sections.
Figure 19:
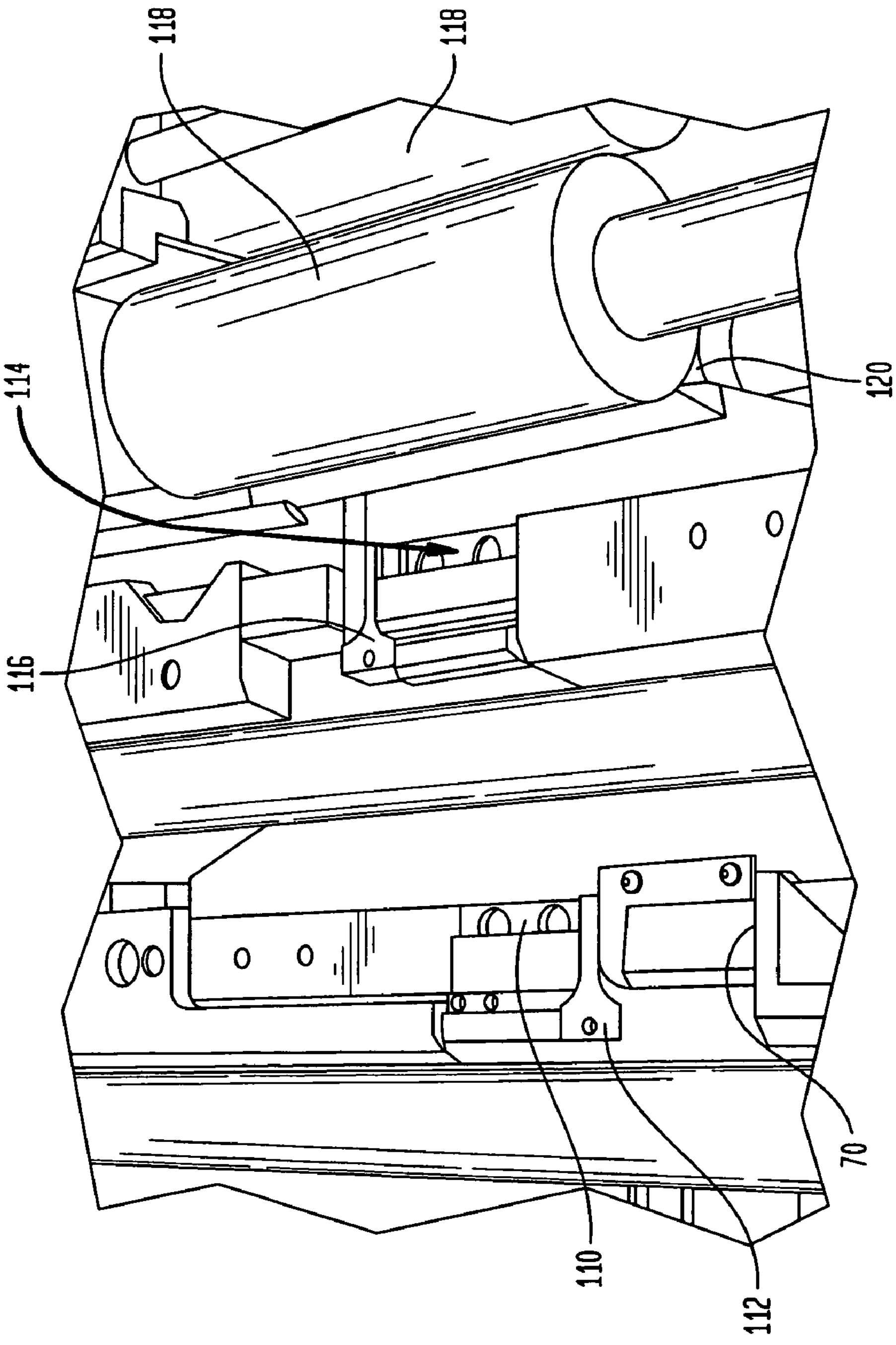
FIG. 19 is another top perspective view of the tabbed divider making apparatus of shown in FIG. 2, with attention to two tip die sections.

As is shown in FIGS. 18 and 19, tube 70 leads to opening 110 and tube 72 leads to opening 114. These openings 110 and 114 are open spaces where the individual sheets of paper, or portions thereof, being fed by the machine in the direction depicted by arrow Y are able to engage the folded film material being provided by cartridges 71 and 73, respectively. In opening 110 a tip die 112 is provided and in opening 114 a tip die 116 is provided. These tip dies 112 and 116 are capable of shearing the film material. In other words, the folded film material is sheared prior to being applied to one edge of the sheet of paper. The folded nature of the film material coming from either cartridge 71 or 73 allows for one portion of the folded film to be disposed on a top portion of the sheet and the other portion of the folded film to be disposed on the bottom portion of the sheet. This will ultimately result in a tab with lamination on both of its sides.

Figure 20:
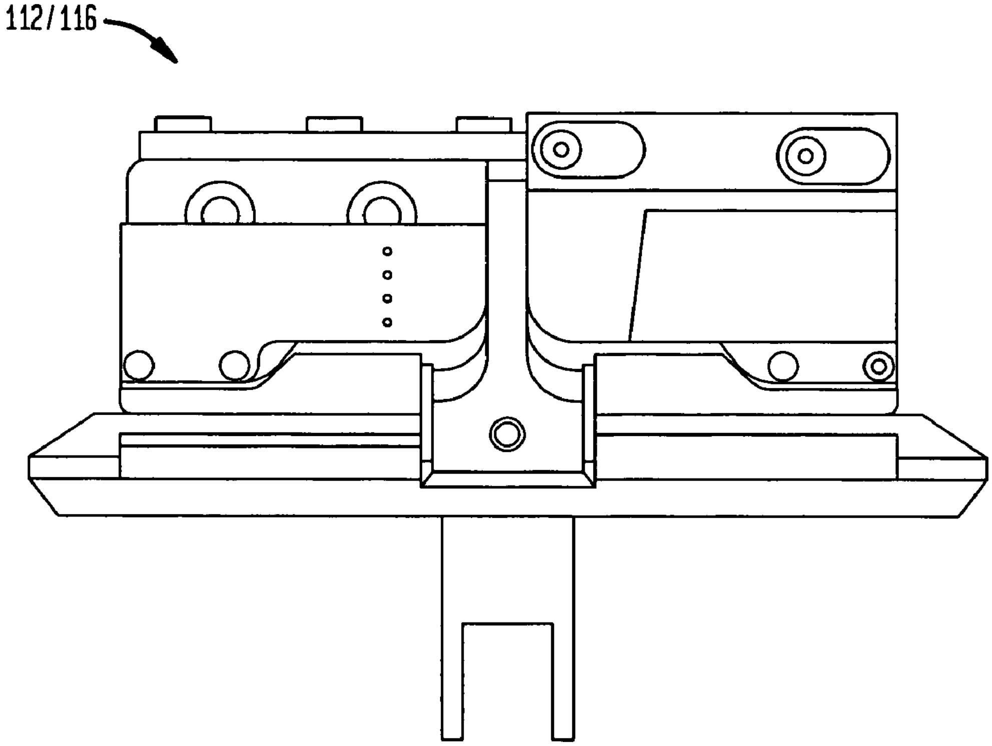
FIG. 20 is an illustration of a tip die for use with the tabbed divider making apparatus shown in FIG. 2.

A more specific depiction of a tip die in accordance with the present invention is shown in FIG. 20. It is to be understood that the shape of the tip die depicted in that figure is but one example of a tip die that may be utilized in accordance with the present invention. Thus, many differently shaped film cuts can be made on the film being fed to the specific tip die. Any waste created during the cutting operation utilizing one or both of the tip dies is preferably withdrawn from processing section 24 through the use of a vacuum system utilizing a similar compressor as described above.

The use of two different cartridges 71 and 73 may allow for machine 20 to continue to operate while one cartridge is being replaced. In addition, use of cartridges 71 and 73 can allow for different sheets of paper to be laminated with different colors. Furthermore, a multi-colored film could be provided by either cartridge 71 or 73 or both. This multi-colored film may include multiple sections of color printed thereon (e.g., red, blue, green, etc.) separated by a registration line. The film would be applied on machine 20 much like the above-described films, by either cartridge 71 or 73 or both. However, machine 20 could be designed so as to sense the registration marks, and automatically cut the film (by cutting out the registration line). For example, ten different color tabs could be made on machine 20 utilizing cartridges 71 and 73 each having a five different color film (i.e., a single film having five differently colored sections). In addition, machine 20 could be provided with a printer mechanism which prints, either on a bare portion of a sheet of paper or over a laminated portion, lettering or indicia desired by a user. Those of ordinary skill in the art would recognize the different printing mechanisms that could be utilized in accordance with the present invention, such as dot thermal or laser printing.

Once the sheet of paper has been provided with a piece of film cut to fit the sheet, and ultimately a specific tab portion, the film is laminated on the sheet of paper. As is partially shown in FIGS. 18 and 19, matched top and bottom heated rollers 118 and 120 are included to provide the sheet of paper with the necessary heat to facilitate the lamination process. In this regard, the film provided by cartridges 71 and 73 can be designed so as to at least partially melt under the temperature provided by rollers 118 and 120. Preferably, rollers 118 and 120 are situated in a top and bottom orientation and are provided with rotation in opposite directions, such the sheet of paper passes between same in the direction of arrow Y (see FIG. 9). In addition, rollers 118 and 120 are spaced apart such that during the passage of the sheet of paper therebetween, the rollers provide pressure in addition to heat to the paper. Machine 20 preferably includes several sets of rollers 118 and 120 so that the sheet of paper is almost continuously provided with this pressure and heat for a specified time, and ultimately, the film material is melted or laminated to the tab portion. It is to be understood that film material may be provided to more than just the tab portions of the divider. However, as a general rule, the larger the area being laminated, the longer the sheet of paper must be subjected to the heat and pressure process. Thus, the more lamination, the longer the manufacturing process. Alternatively, additional heat may be provided to the sheet in order to more quickly melt the film material.

Figure 21A:
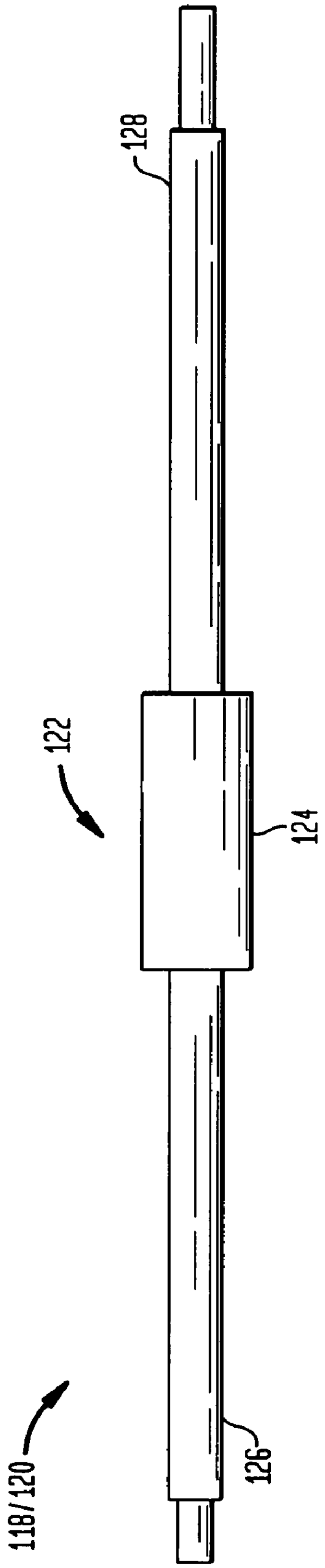
FIGS. 21A and 21B are a perspective view and an illustration of a heated roller for use with the tabbed divider making apparatus shown in FIG. 2, respectively.
Figure 21B:
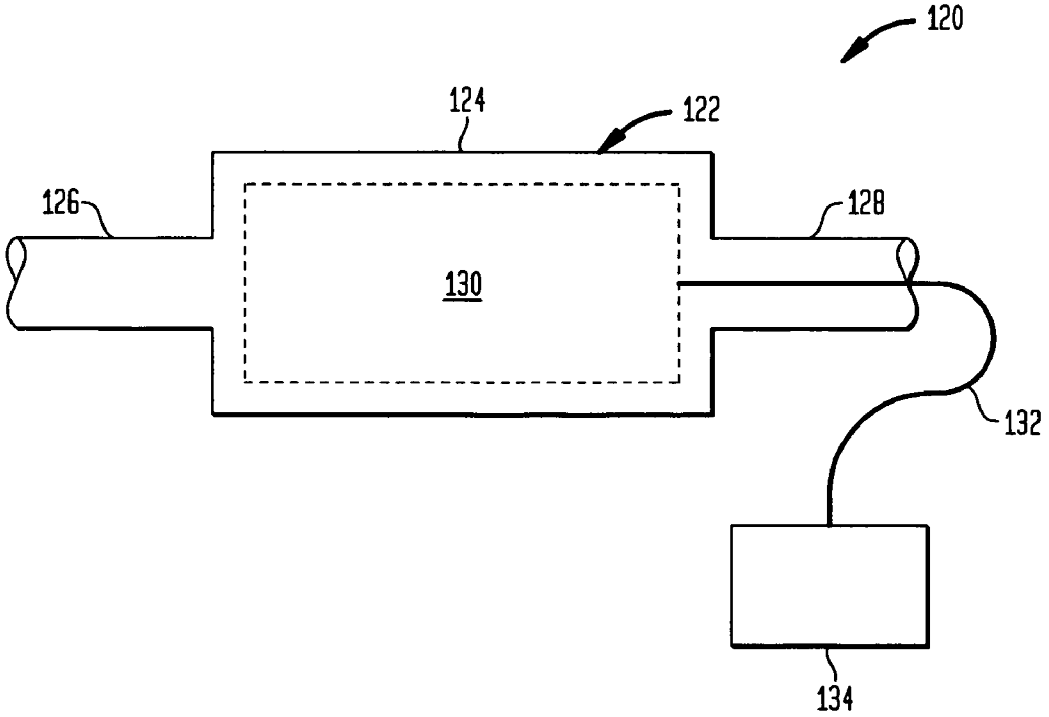
Figure 22:
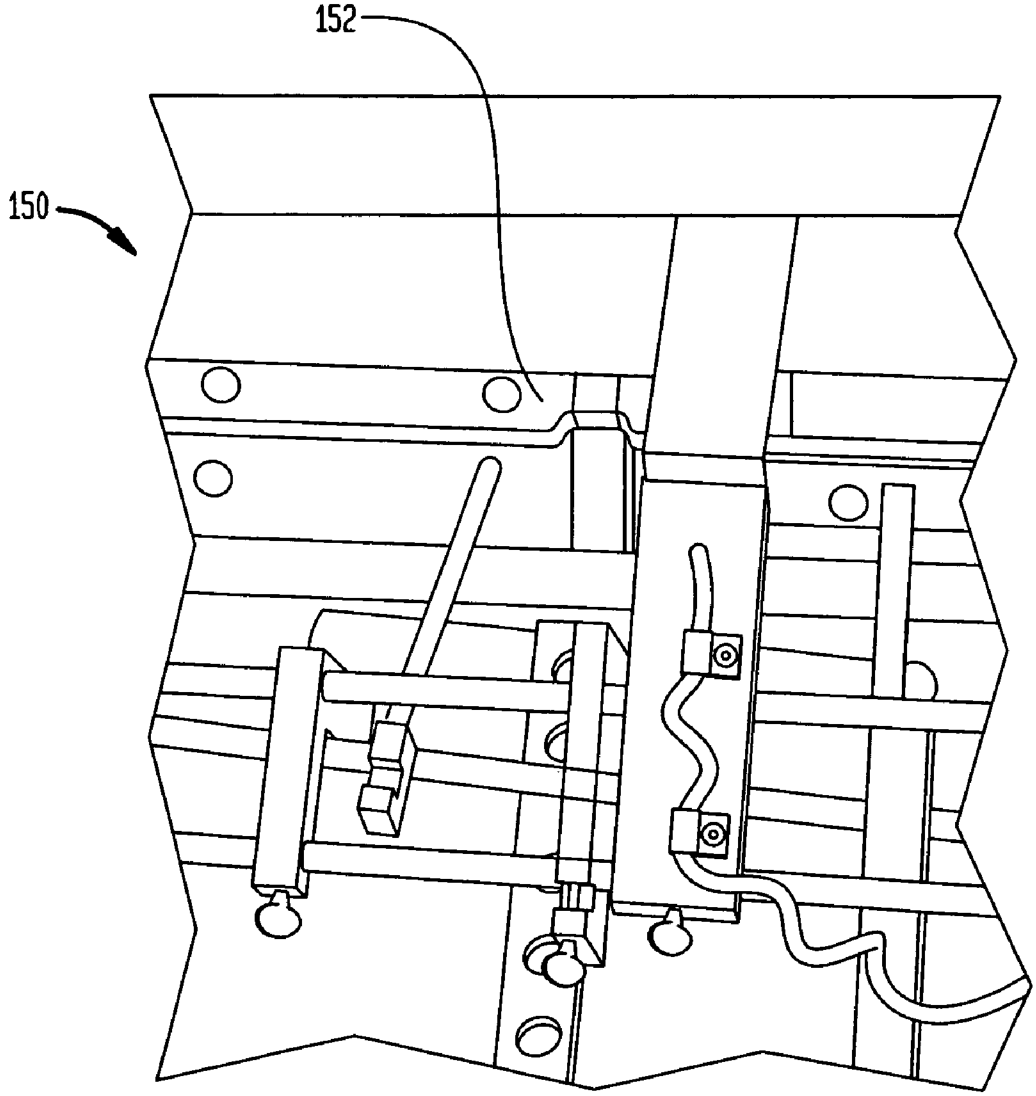
FIG. 22 is a view of a knife package unit of the tabbed divider making apparatus shown in FIG. 2.

FIGS. 21A and 21B depict one individual roller 120. As is shown in those figures, roller 120 preferably includes a solid body 122 having a larger central portion 124 flanked by two smaller exterior portions 126 and 128, respectively. This solid body 122 obviously reduces the overall amount of components needed to create roller 120, and therefore simplifies the construction of same. A heating element 130 is disposed within central portion 124 and connected, via a connection 132, to a controller 134. Connection 132 is shown as a wire, which extends from heating element 130 through exterior portion 128 and ultimately to controller 134. It is to be understood that this connection can be many different types of connections, such as a wireless connections among others, and can extend through either of exterior portions 126 or 128. Similarly, heating element 130 may be many different types of heating elements, such as a cartridge heater. Controller 134 preferably acts so as to measure the temperature being provided by roller 120 to a sheet of paper being processed by machine 20 and vary such according to operator instructions and/or an embedded machine program. In this regard, it is to be understood that, although not shown, several temperature reading elements (e.g., thermometers) may be provided within machine 20 to measure the temperature being provided to the sheet of paper by the individual rollers. Those of ordinary skill in the art would readily recognize the many different controllers 134 which may be provided to properly control the temperature output by roller 120.

Subsequent to passing through the plurality of roller 118 and 120 combinations, the sheet of laminated paper is then fed into knife package unit 150. Essentially, this unit acts to shear the sheet of laminated paper along an edge which will ultimately include a tabbed portion, in all portions but where the tabbed portion will reside. Preferably, this portion is the portion on which the film has been laminated. Specifically, knife package unit 150 is a standard shear having a cut-out 152 which corresponds to the tabbed portion that will remain on the sheet of paper subsequent to the shearing operation. Those of ordinary skill in the art would recognize the many different shear structure designs that could be utilized in the present invention. Ultimately, depending upon the position of the sheet of paper set by the position of stop 62, a divider having tabs like tabs 12*a*-12*e* of dividers 10*a*-10*e* shown above, can be created. In other words, the positioning of a sheet of paper entering knife package unit 150 will dictate where the tabbed portion will be located with respect to the rest of the sheet.

Figure 23A:
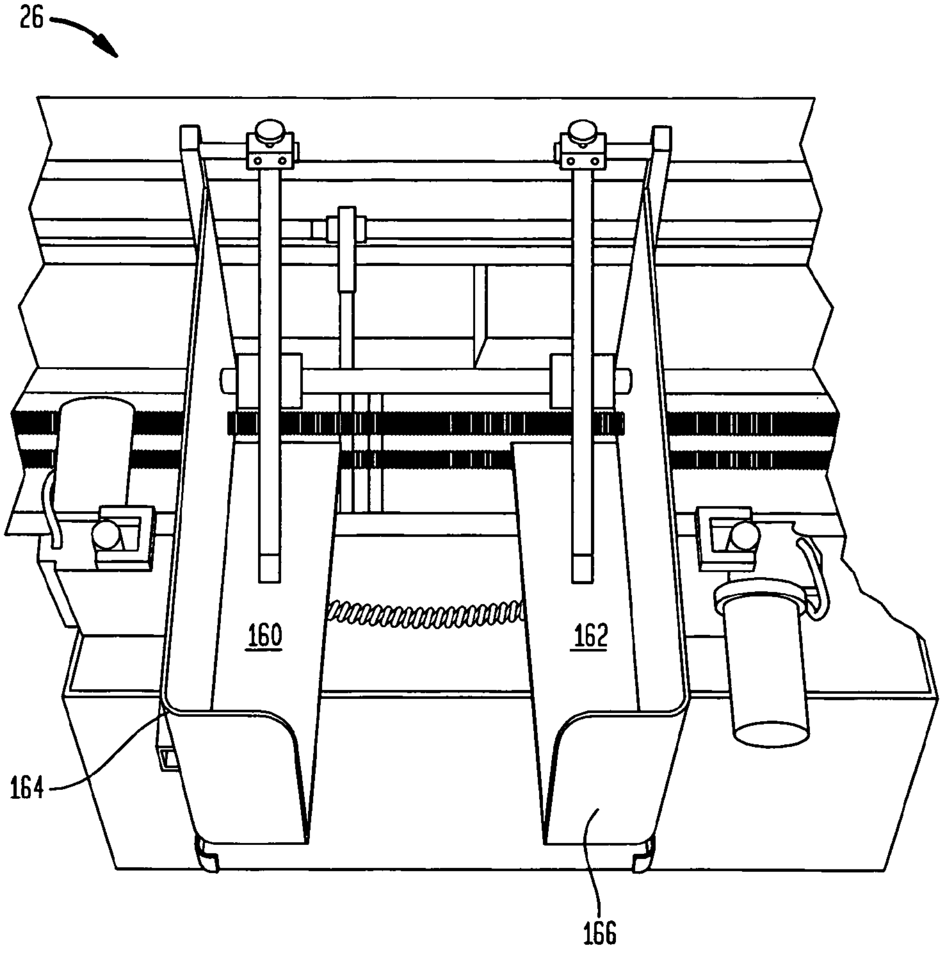
FIG. 23A is a view of an output tray of the tabbed divider making apparatus shown in FIG. 2, with bottom portions in closed positions.
Figure 23B:
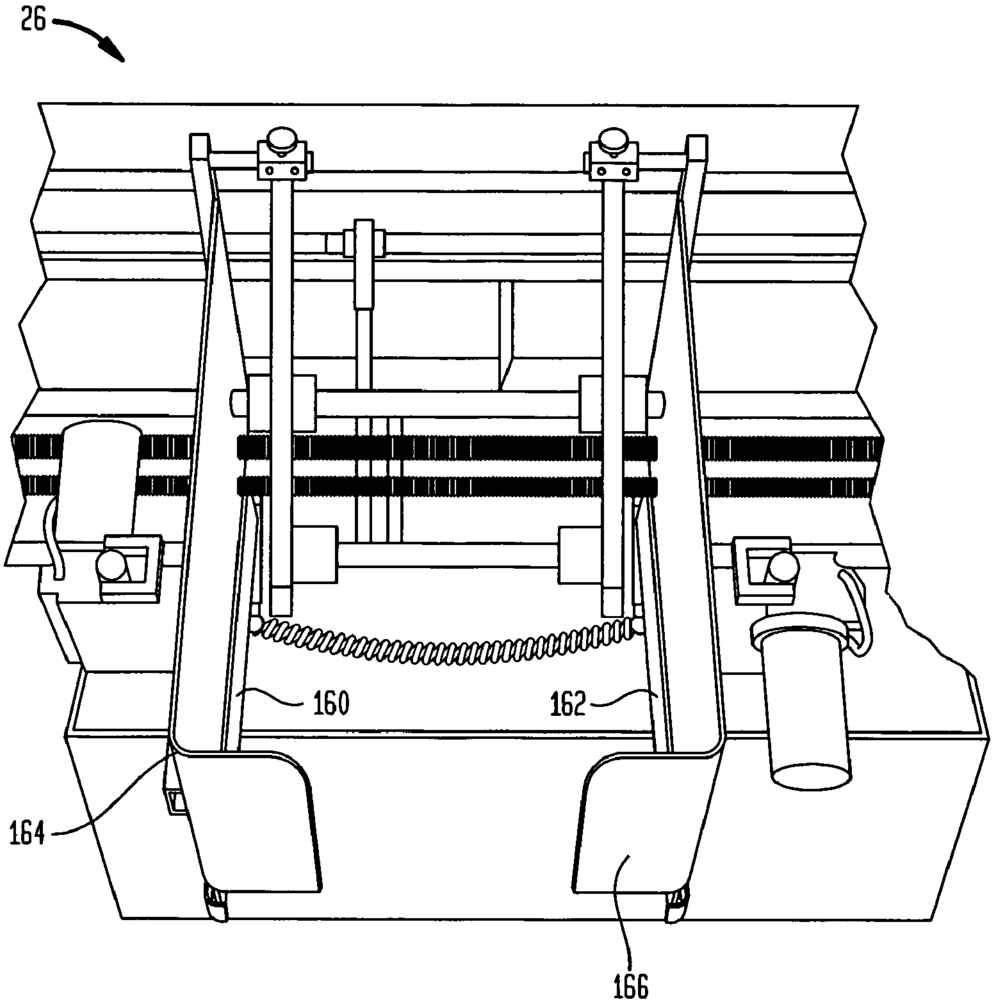
FIG. 23B is a view of an output tray of the tabbed divider making apparatus shown in FIG. 2, with bottom portions in open positions.
Figure 24:
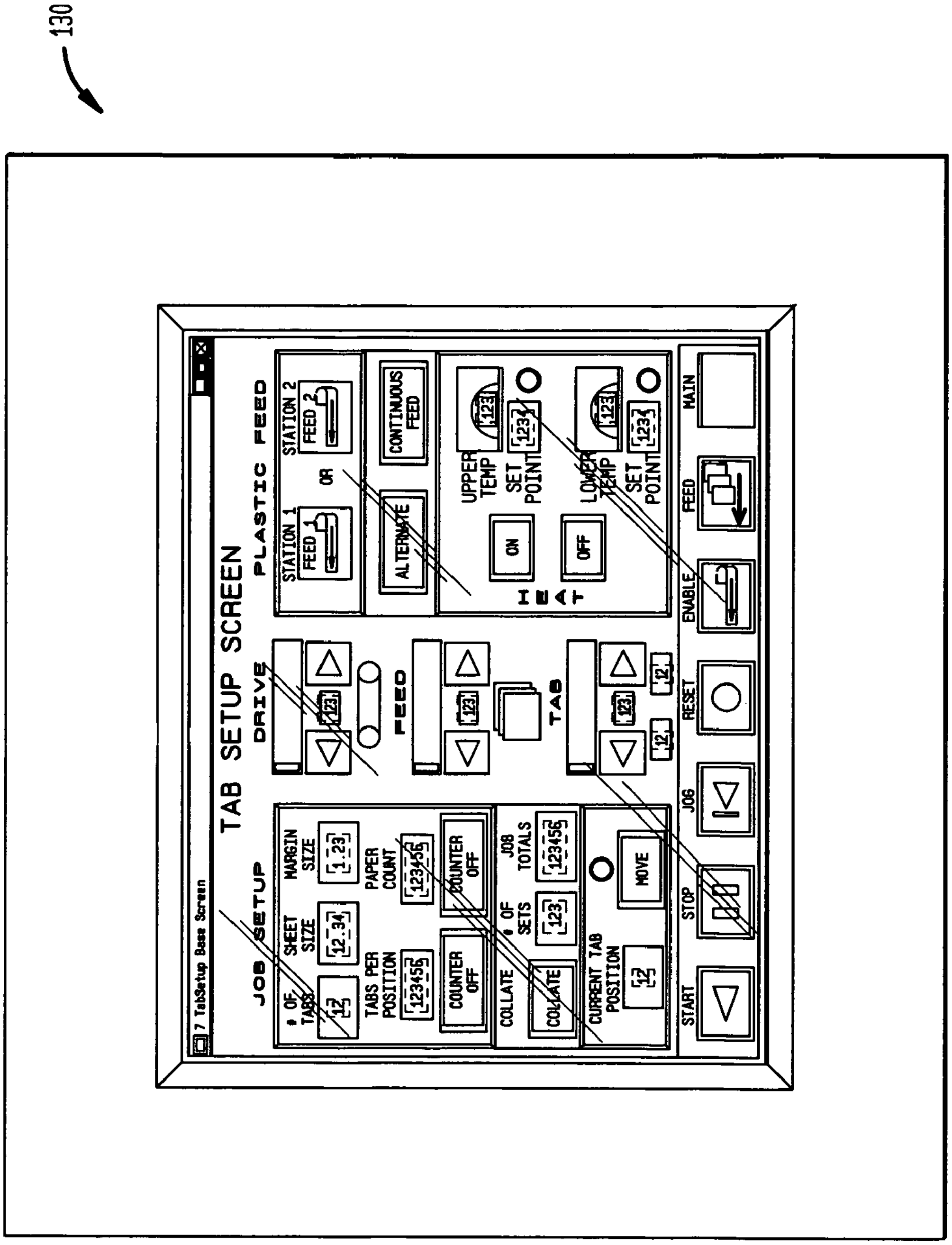
FIG. 24 is a front plan view of a computer control panel for use in connection with the tabbed divider making apparatus of FIG. 2.

After the above steps, the sheet of paper has essentially become a divider having a laminated tabbed portion. Examples of these dividers are shown in FIGS. 1A-1E. FIGS. 23A and 23B depict the final portion of machine 20, output tray 26, which is where the dividers are ultimately disposed. This tray 26 is designed so as to act like a trap door, in that it is designed to automatically drop a pre-determined batch of tabbed dividers upon their completion. The two bottom portions 160 and 162 of tray 26 are preferably hingeably connected to two side portions 164 and 166. Tray 26 is shown in FIG. 23A with bottom portions 160 and 162 in position to receive and retain a plurality of tabbed dividers. After a predetermined number of such dividers builds up in the tray, or in response to a direct command from an operator, bottom portions 160 and 162 are opened to the position shown in FIG. 23B, thereby dropping the dividers. This could allow for a box or other carrier, or even a conveyor to be placed underneath tray 26 for receiving the finished dividers. Tray 26 thus further simplifies the operator's job.

Machine 20 preferably provides for computer control of the entire process described above. Very little, if any, manual operation is required by an operator. In fact, machine 20 preferably includes a touch screen 130 (shown in detail in FIG. 24) which allows an operator to input all the desired settings for the particular batch of tabbed dividers being manufactured by the machine. Of course, other input devices may be used, such as keyboard, mouse, trackball, etc. For example, an operator may input the paper size, margin size and number of tabs per divider set, among other information. With this information, machine 20, preferably under processor control, automatically determines the size of each tab, sets the size of film required to laminate each tab, and sets stop 62 to ensure the tab is positioned properly on the divider. The movement of necessary components may be accomplished by motor and pulley systems operated by the computer control, or in certain cases, more complicated transmission systems. In addition, machine 20 may further determine which tip die 112 or 116 is utilized to shear the film material. There is simply no need to remember or look up specific settings, or make manual adjustments on the part of an operator during operation of machine 20. In addition, machine 20 can preferably store one or more jobs so that subsequent operations may be performed without requiring the re-input of settings. Therefore, sporadically run jobs (e.g., once a month for a particular customer) may be stored and easily recalled when needed. During operation, an operator may easily utilize touch screen 130, load paper on feeder 22 and remove finished dividers from tray 26 (if necessary) without the need to move around machine 20 or even move a significant distance. A programmable logic controller or even a typical personal computer can be used for storing the information and running the necessary programs to control operation of machine 20.

Depending upon the position the sheet of paper that is held at stop 62 and which tip die is being utilized to make the necessary cuts, the positioning of the tab on the divider will be determined. Thus, movement of moveable stop 62 to different positions determines which one of, for example, dividers 10*a*-10*e* is created out of an individual sheet of paper. Similarly, depending upon the particular tip die 112 or 116 being utilized and the color of film being introduced by cartridge 71 or 73, the particular color of the tab can also be determined. Therefore, without having to significantly vary the orientation (e.g., flip over) of the individual sheets of paper, a complete set of tabbed dividers (e.g., dividers 10*a*-10*e*) can be produced by machine 20. This can be done "on the fly" thereby creating collated sets of dividers, or can be done one particular divider at a time, which can thereafter be collated or packaged as is.

Figure 25:
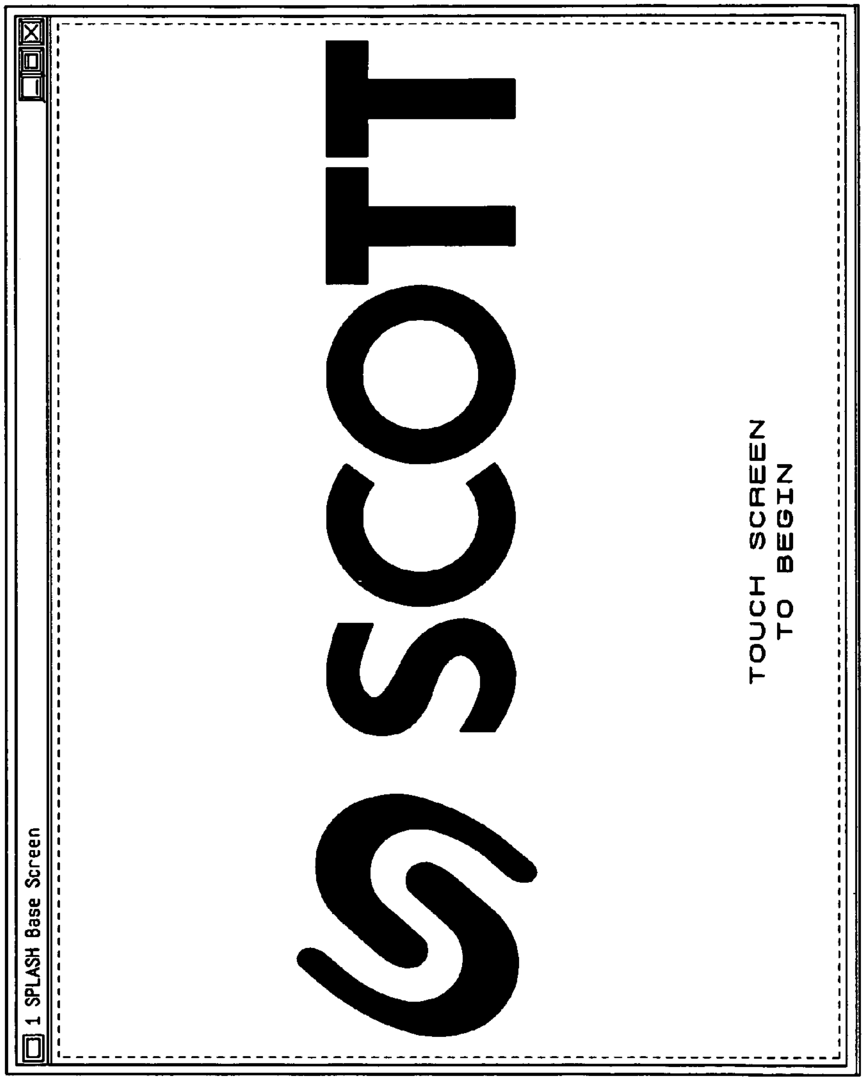
FIGS. 25-33 are different screen shots depicted by the control panel of FIG. 24.
Figure 26:
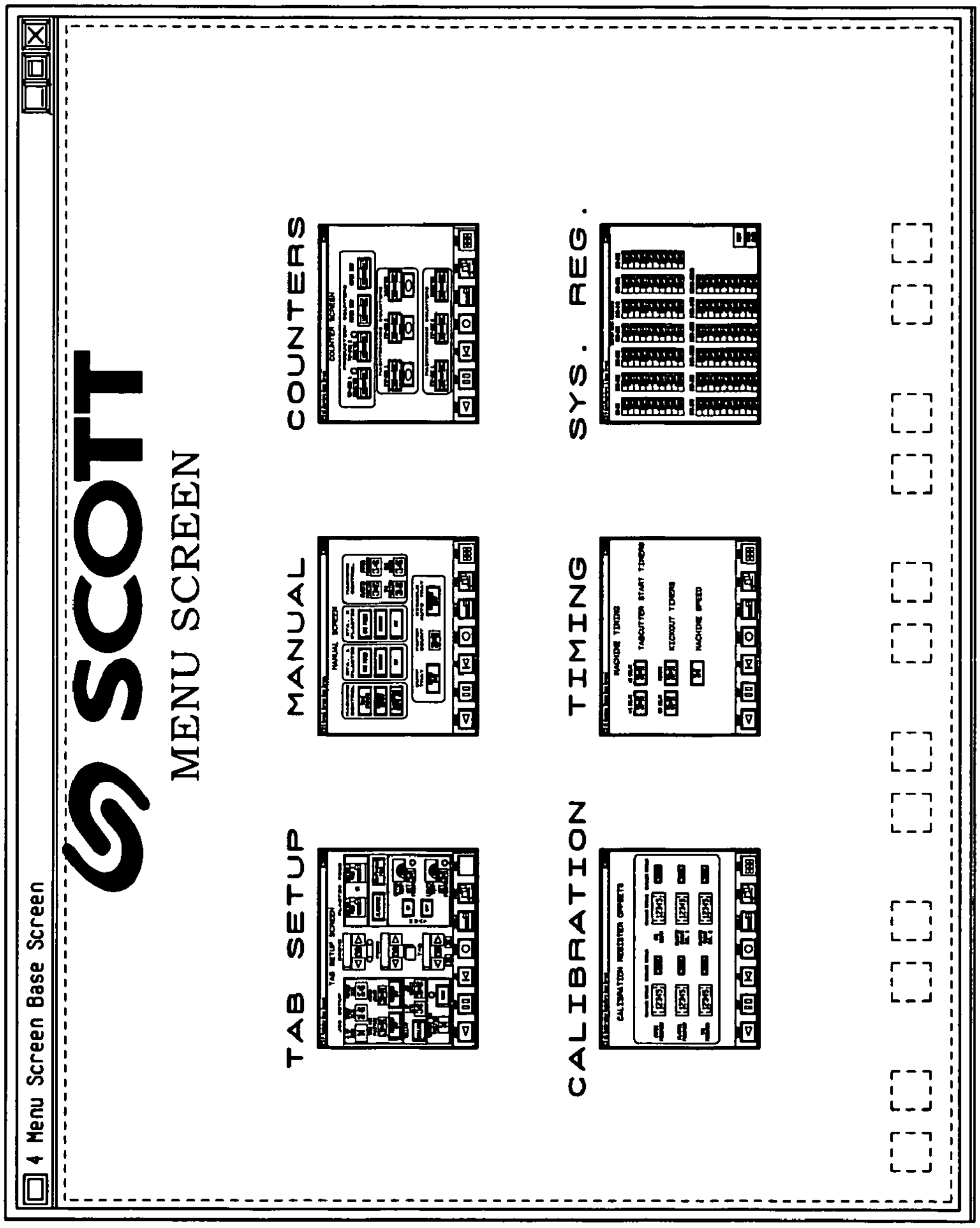
Figure 27:
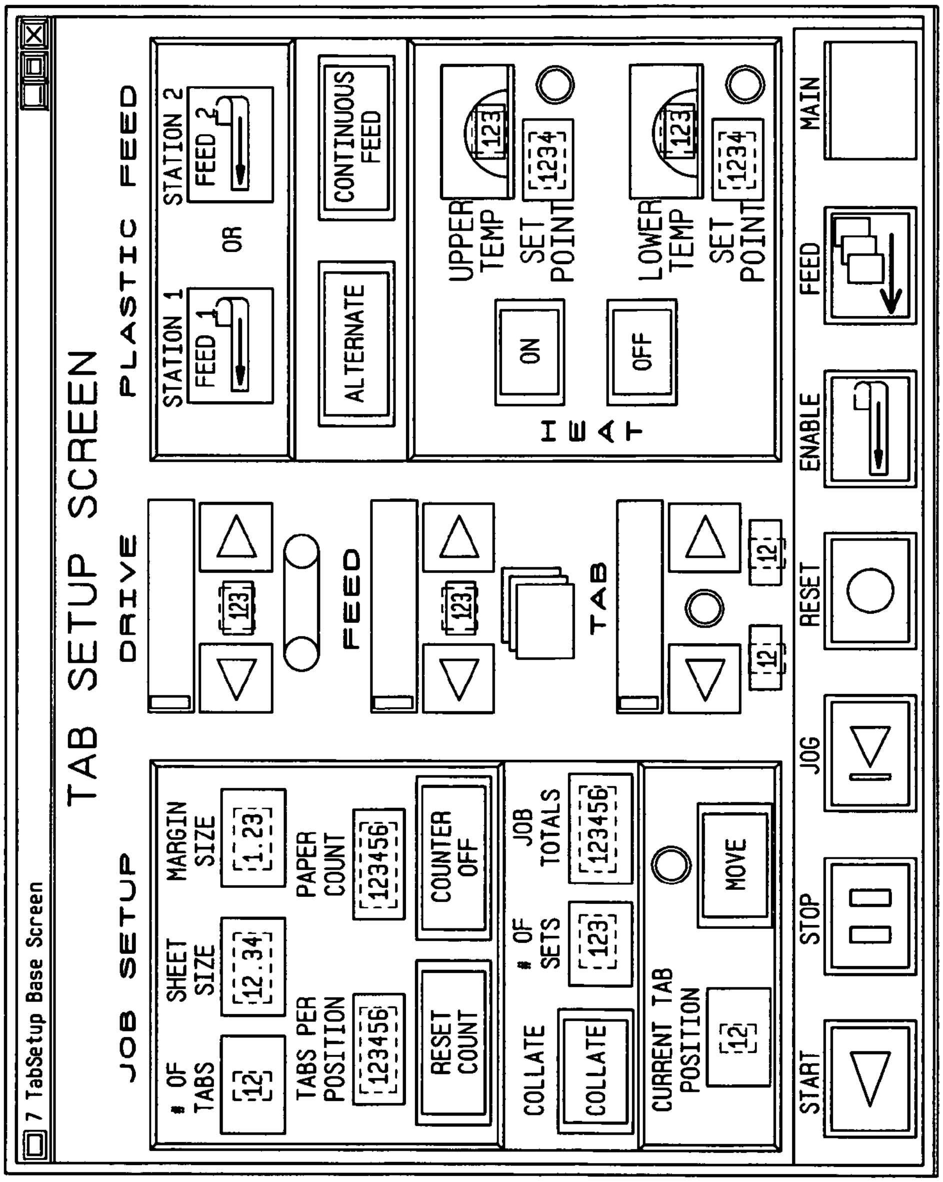
Figure 28:
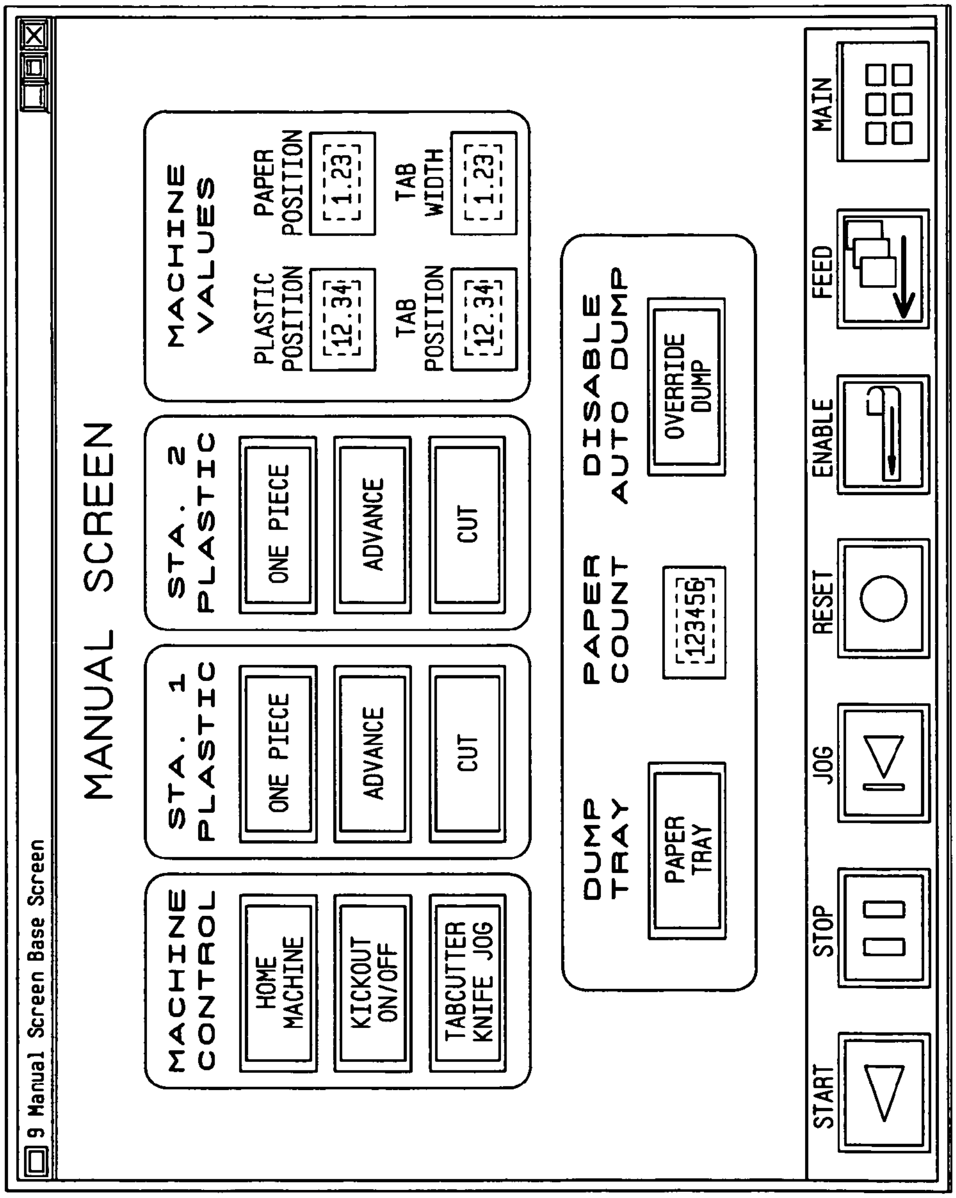
Figure 29:
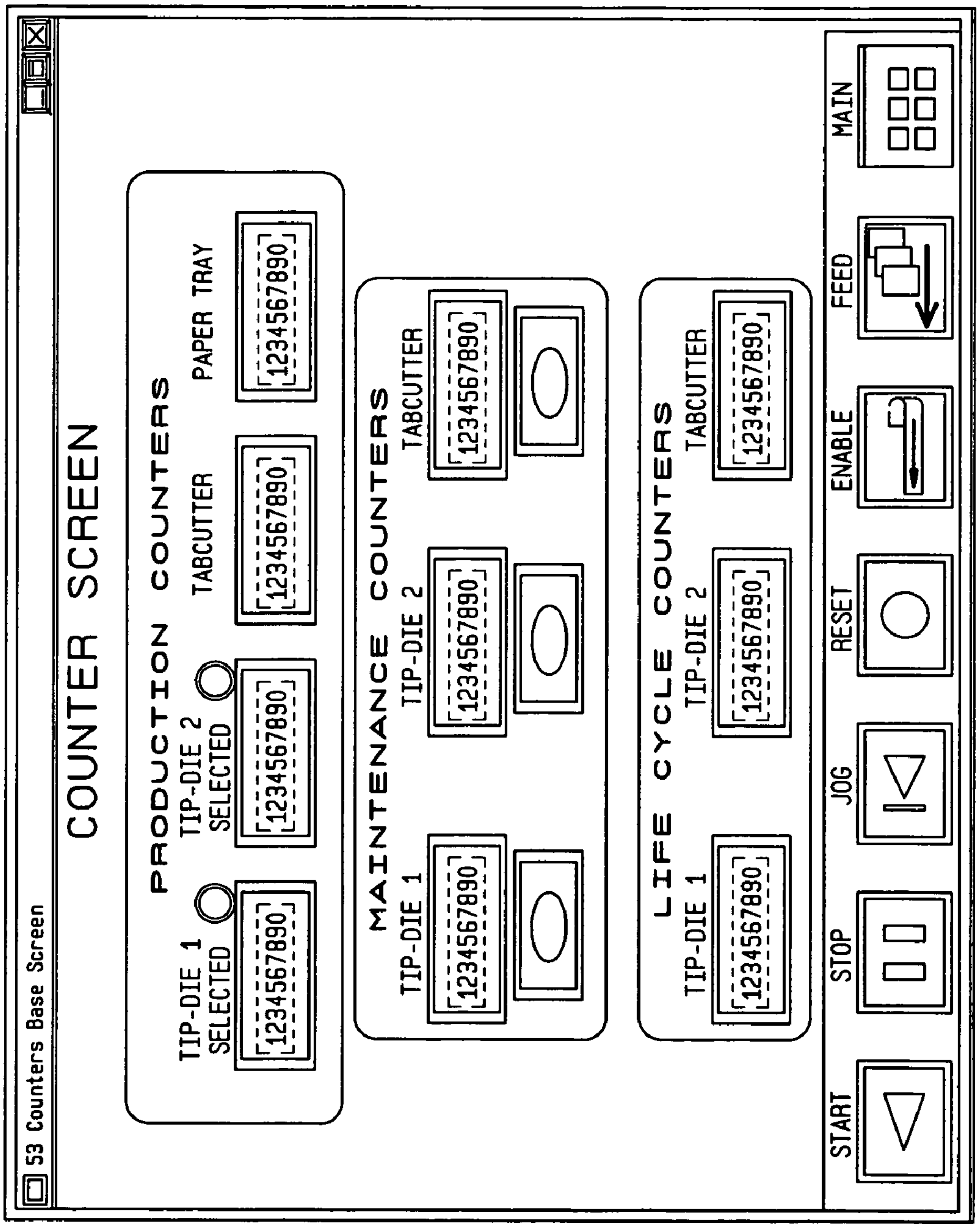
Figure 30:
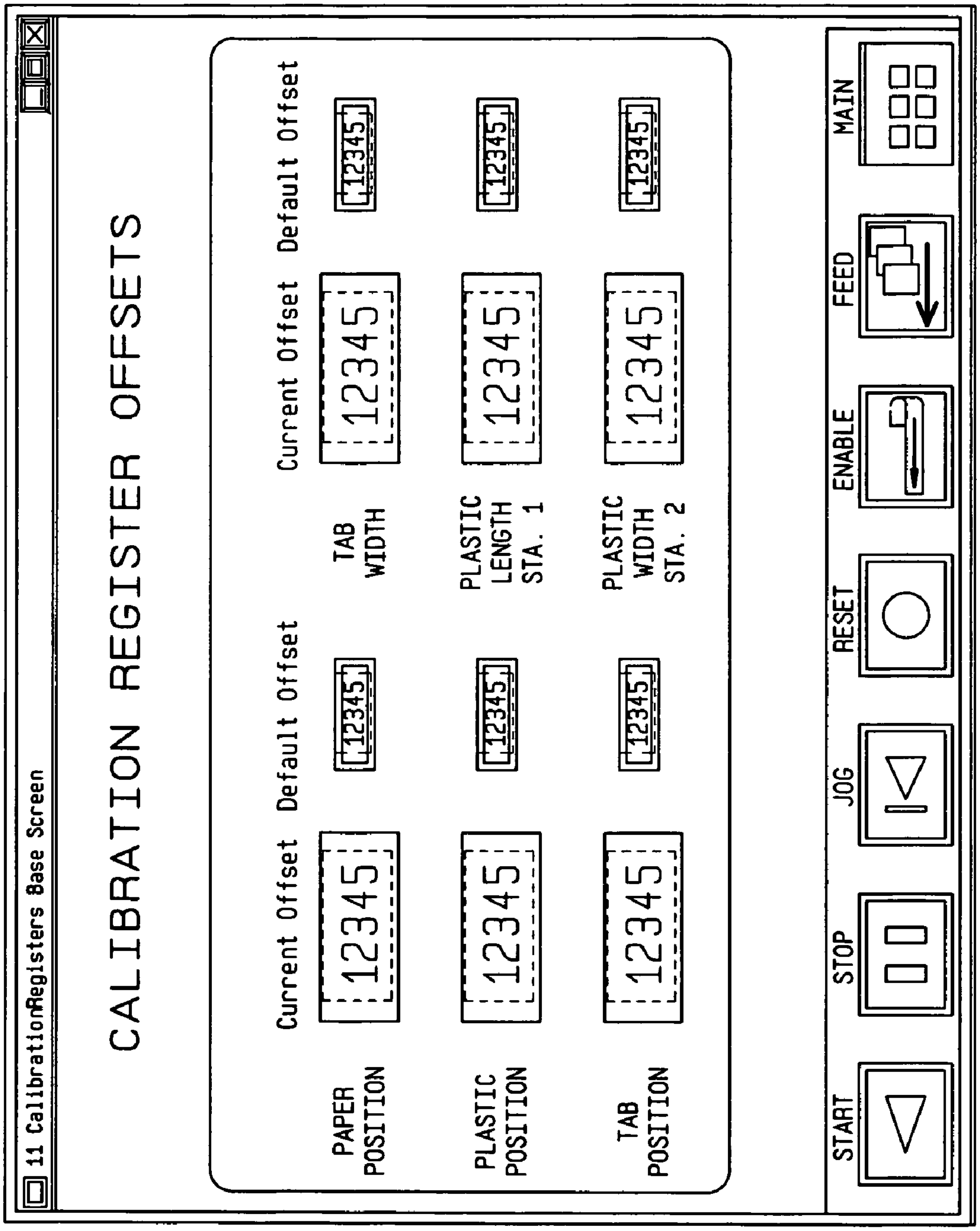
Figure 31:
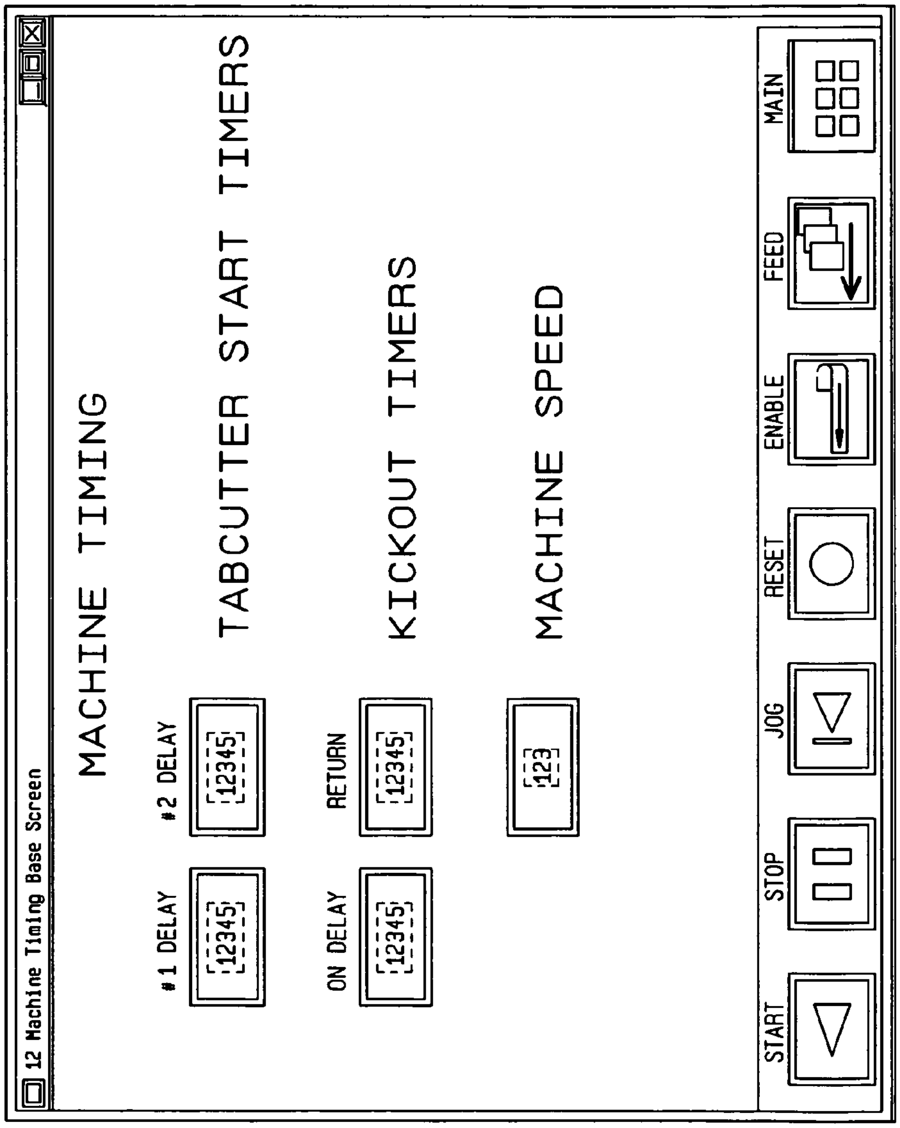
Figure 32:
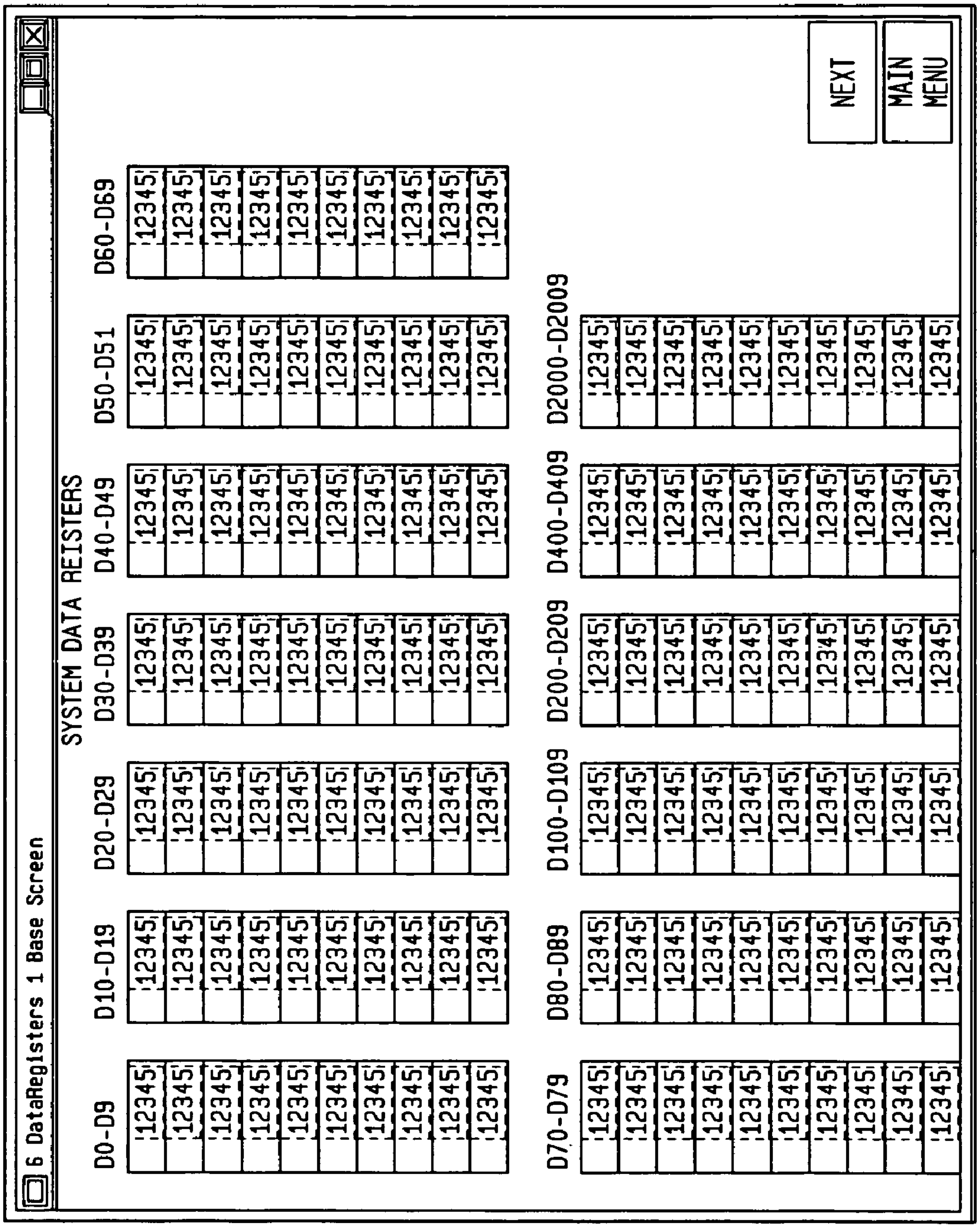
Figure 33:
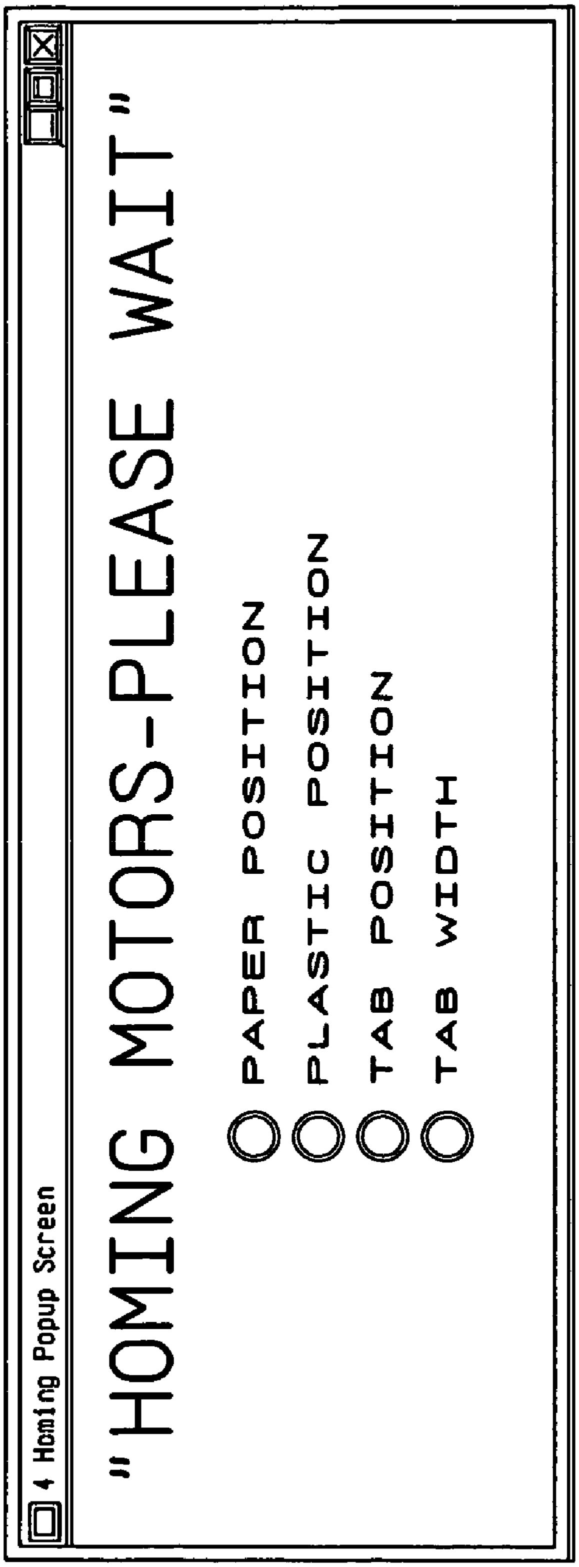
Figure 34:
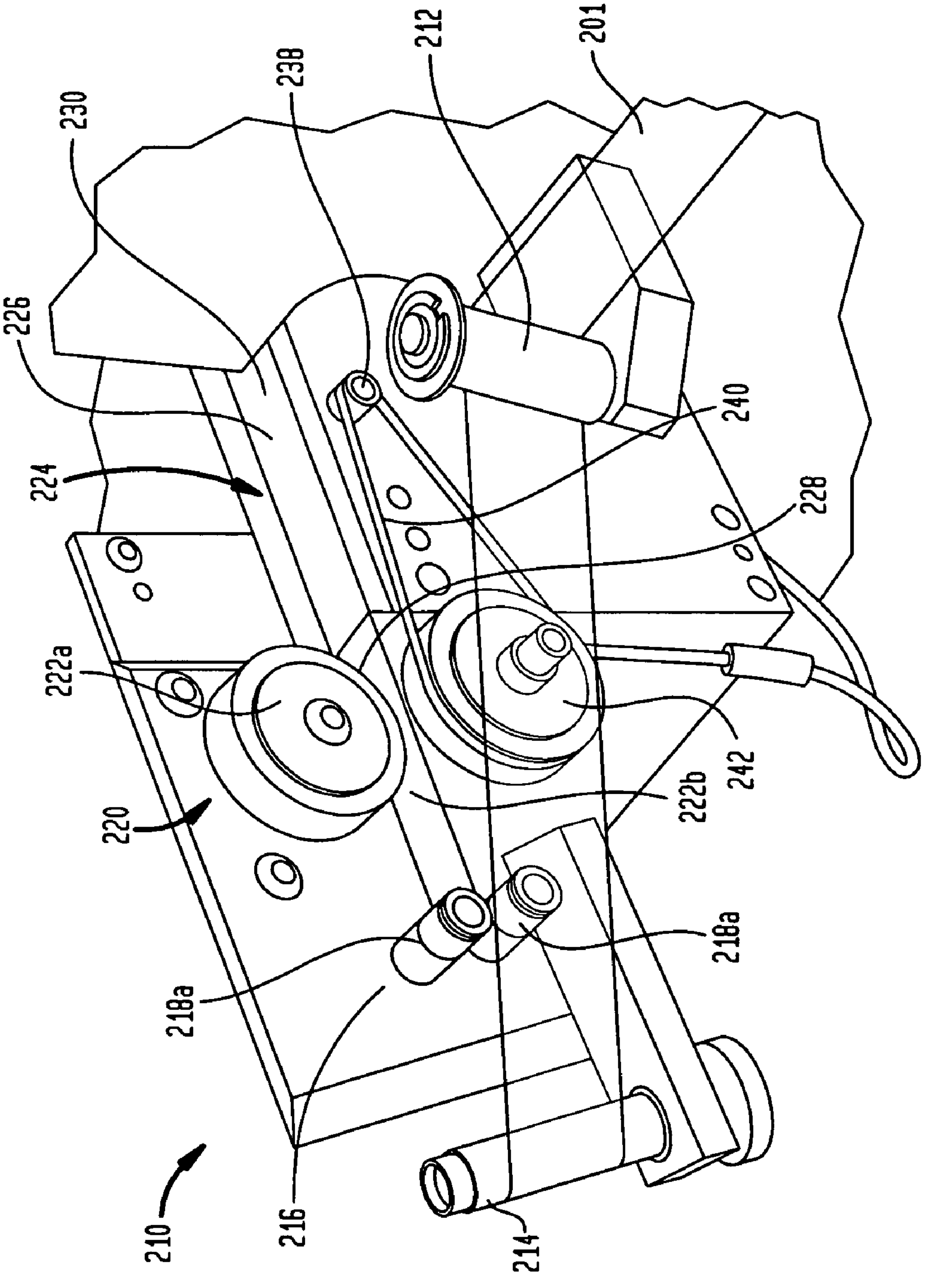
FIG. 34 is a perspective view of a film delivery system in accordance with one embodiment of the present invention.

FIGS. 25-33 depict certain of the screens that may be displayed on touch screen 130 prior to or during operation of machine 20. Specifically, FIG. 25 illustrates a beginning screen which prompts an operator to touch screen 130 in order to begin. FIG. 26 shows a menu screen which is essentially a home screen that allows an operator to make selections related to specific settings of machine 20. FIG. 27 shows a screen on which information relating to paper size, tab size and other data can be inputted in order to set machine 20. This screen not only allows for the input of the aforementioned data, but also allows an operator to determine the type of collation, which cartridge 71 or 73 provides the film material and the tab position, among other inputs. FIG. 28 depicts a screen that would be displayed should an operator require manual operation of certain functions of machine 20. This could be utilized for diagnostic purposes, for testing or to correct a problem with machine 20. Still further, FIG. 29 shows a display relating to the different counts kept by machine 20. For example, this screen shows values relating to the amount of times the different tip dies are selected, the amount of tab cuts and the amount of paper processed by feeder 22. In addition, the screen shown in FIG. 29 also gives an operator information relating to the maintenance of certain aspect of machine 20 and the remaining life cycle of certain of the non-permanent components of the machine. FIGS. 30 and 31 depict information relating to calibration of machine 20 and timing of machine 20, respectively, while FIG. 32 gives a read out of values relating to the system data registers. This latter set of values may be important in programming machine 20. Finally, FIG. 33 shows a screen which may be displayed during one or more of the operations of machine 20. It is to be understood that touch screen 130 provides an interactive experience for an operator. For example, an operator can utilize such screen to select or input a setting, and/or reset a count depicted.

In preferred embodiment of the present invention, machine 20 is approximately 32 inches wide so as to allow for many differently sized sets of dividers to be created. All of this can preferably be done without having to reposition paper once loaded into feeder 22. A preferred machine is capable of producing collated sets of tabbed dividers at a rate of approximately 5,000 tabs per hour and approximately 11,000 to 12,000 non-collated sets of tabbed dividers per hour. All of this can be done with minimal actual operation on the part of an operator. In addition, the automated aspect of machine 20 ensures that accurate and precise sets are created over and over again.

Referring to the remaining drawings, FIGS. 34-38 depict an alternate film delivery system designated generally by reference numeral 210. While machine 20 may indeed operate in the manner discussed above (i.e., film fed through tube 70 by cartridge 71 or film fed through tube 72 by cartridge 73), system 210 may improve upon such operation. Essentially, system 210 provides for an improved delivery system which significantly reduces the occurrences of jamming of film, thereby improving the overall performance and efficiency of machine 20.

In the design shown, system 210 includes a source of film material (not shown) that presents a continuous stream of film material 201, a first guide roller 212, a second guide roller 214, a film folding apparatus 216 having two fold rollers 218*a* and 218*b*, and a film drive 220 having two drive rollers 222*a* and 222*b*. It is to be understood that the source of film material may in fact be similar or identical to cartridges 71 and 73, but may also be a simply roll of film material or the like. In operation, film material 201 is fed from its source around first guide roller 212, around second guide roller 214, and into film folding apparatus 216. First and second guide rollers 212 and 214 preferably not only guide the film, but also keep tension on continuous stream of film material 201. Material 201 is then preferably fed between fold rollers 218*a* and 218*b* in a folded fashion, such that folding apparatus 216 feeds material 201 to the rest of system 210 in this state. It is noted that this folded state may initially be created manually by an operator during loading of film material 201, but preferably thereafter is maintained by folding apparatus 216 until reloading of material 201 is necessary. Once through apparatus 216, film material 201 is preferably pulled (in its folded state) through film drive 220 by drive rollers 222*a* and 222*b*. It is noted that rollers 222*a* and 222*b* are preferably mechanically powered to rotate opposite to one another, thereby both pulling film material 201 from folding apparatus 216 and pushing film material 201 to the remaining components of system 210 discussed below.

While different iterations of the above-described feeding mechanisms may have been present in existing machines, the remaining aspect of system 210 is an improvement upon same. System 210 further includes a tunnel assembly 224 having a tunnel cover 226, a tunnel bottom 228, and a vacuum belt 230 (best shown in FIGS. 35, 36, and 38). Assembly 224 is designed to allow film material 201, in the aforementioned folded state, to pass therethrough. Specifically, tunnel cover 226 is preferably shaped and sized to fit over tunnel bottom 228, thereby forming a passage between the two elements, and just large enough to allow for the passage of folded material 201. In the embodiment shown cover 226 is U-shaped and constructed of transparent plastic. However, it is to be understood that cover 226 could be many different shapes and could be constructed of many different materials. The U-shape shown tends to ensure the smooth passage of material 201 through tunnel 224, without the material becoming skewed or dislodged from the tunnel. In addition, the transparent nature of the component shown allows for visual confirmation of the smooth transfer of material 201 to be conducted. Bottom 228, on the other hand, is shown as a solid body constructed from a metallic material. In fact, in the design shown, bottom 228 is one end of a larger body integrated into the machine. It is to be understood that bottom 228 could vary in size and shape, so long as such properly cooperates with cover 226 to allow the smooth passage of material 201 through tunnel 224.

Figure 35:
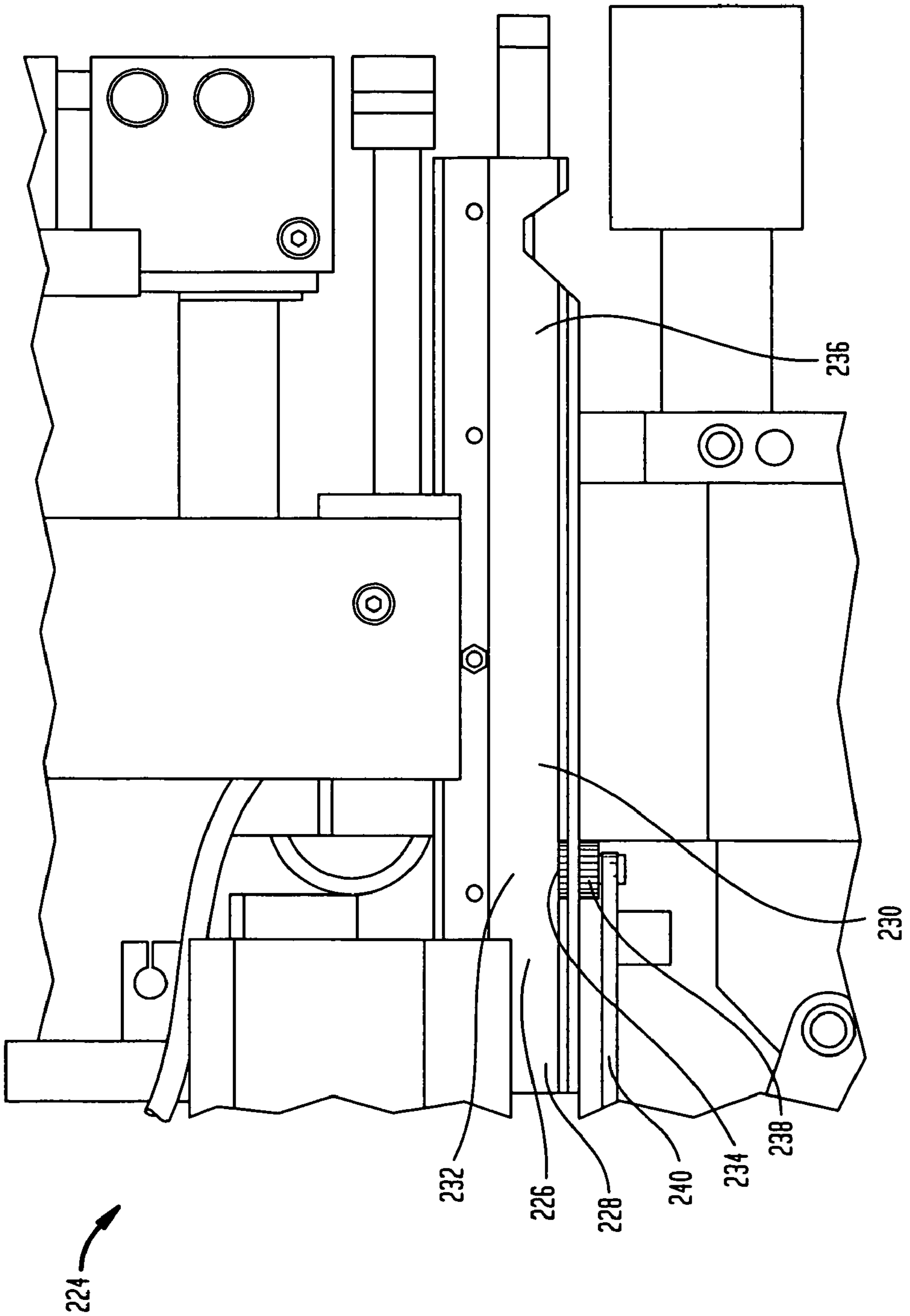
FIG. 35 is a perspective view of the film delivery system of FIG. 34, with attention on a tunnel section.
Figure 36:
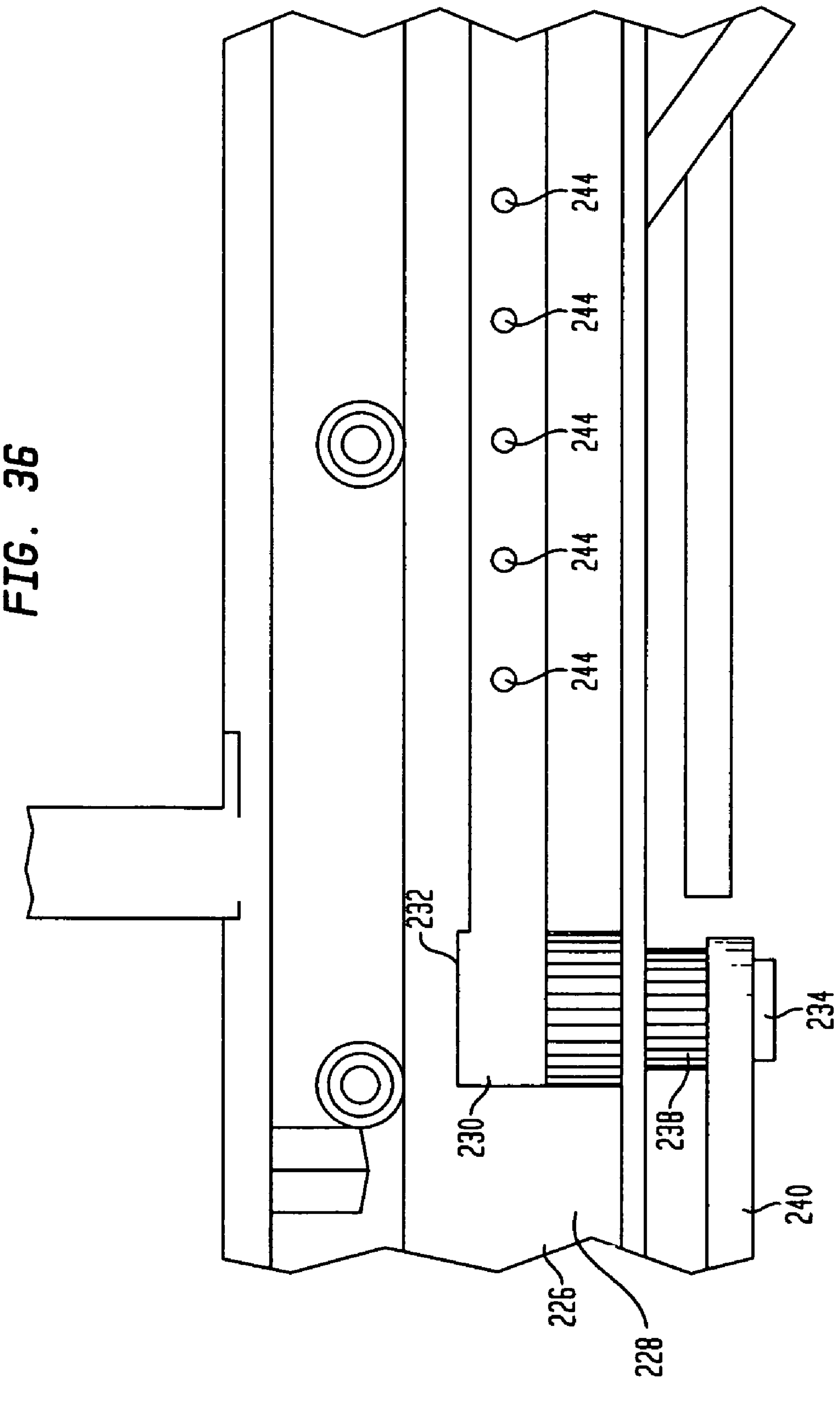
FIG. 36 is an enlarged view of the tunnel section of FIG. 35, with attention on a vacuum belt.
Figure 37:
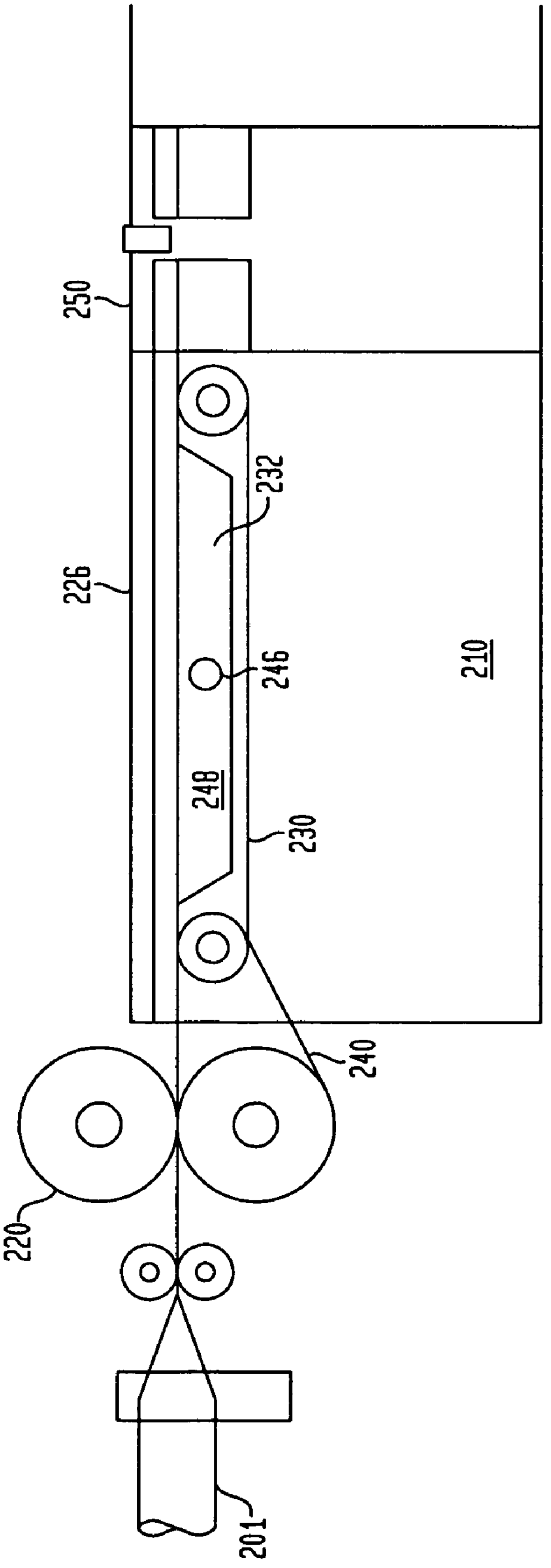
FIG. 37 is a schematic side view of the film delivery system of FIG. 34.
Figure 38:
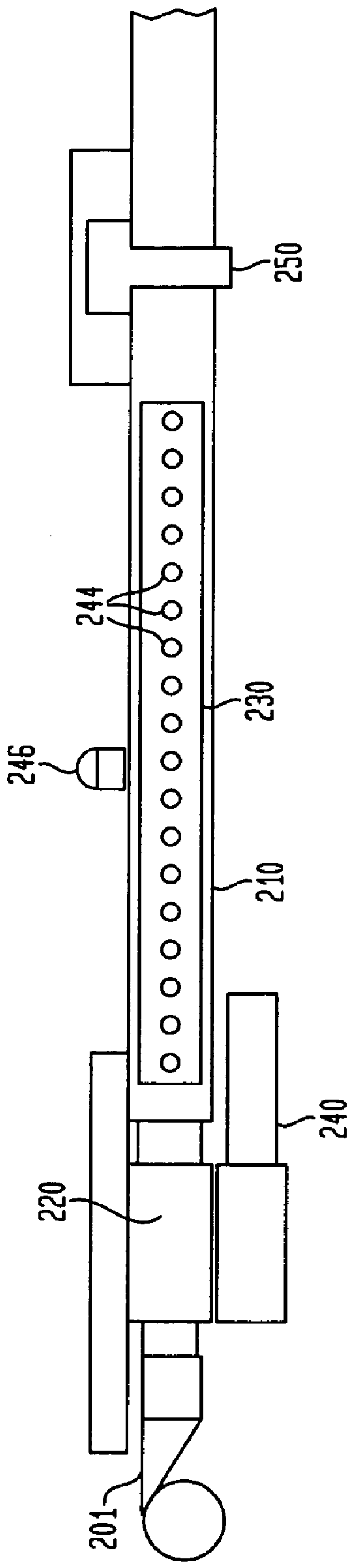
FIG. 38 is a schematic top view of the film delivery system of FIG. 34.

Vacuum belt 230 is preferably situated so that is extends on top of bottom 228, at least partially along the length of tunnel assembly 224. In the embodiment shown, belt 230 is actually built into a channel 232 formed in the top of bottom 228. The cooperation between belt 230 and the other elements of tunnel 224 are best shown in FIGS. 35 and 36. Channel 232 is preferably an elongate channel cut into bottom 228 and having sections at either end for allowing for rotating elements to be attached to belt 230. More particularly, at a first end, belt 230 is attached to a drive axle 234 and, at a second end, to a free rotating axle 236. Drive axle 234 is in turn preferably attached to a gear 238 that is connected by a belt 240 to a like gear 242 disposed on the same rotational element as drive roller 222*b*. Therefore, power being provided to rotate drive roller 222*b* is also being provided to cause the proper movement of belt 230. In addition, this cooperation substantially ensures that the pushing of material 201 being provided by film drive 220 is properly timed with the pulling effect being provided by belt 230. Those of ordinary skill in the art would readily recognize that many different cooperations could be employed to achieve the same or similar results. For example, belt 230 could be powered by a separate motor or driver.

Belt 230 is preferably constructed of a rubber-like material that allows for the necessary bending of the belt during its rotation about axles 234 and 236. Such a rubber-like material may also inherently provide for a gripping of film material 201 once captured by belt 230. This in turn causes the pulling of material 201 by belt 230 upon the rotation of the belt in the clockwise direction in the view shown in FIG. 34. Moreover, belt 230 is provided with a plurality of apertures 244 (best shown in FIGS. 36 and 38) that extend through the belt structure. Any number of apertures 244 may be provided, including a single aperture. These apertures 244 preferably provide a conduit into the above discussed channel 232, which includes a vacuum supply 246 and vacuum manifold 248 disposed therein. This configuration allows for suction to be formed through apertures 244, thereby further aiding in the gripping of film material 201 disposed over belt 230. The schematic nature of FIGS. 37 and 38 broadly demonstrate one manner in which the vacuum supply 246 and manifold 248 may be situated in channel 232. However, many other designs could also be employed. In the most basic sense, any type of suction which can be transferred to apertures 244 can be utilized in connection with the present invention. For example, a separate compressor could be utilized and connected to channel 232 (through a fluid connection). This would provide the necessary suction to channel 232, which would in turn be provided to apertures 244. Of course, the more air tight the cooperation between bottom 228, belt 230, and channel 232, the more effective the suction through apertures 244 can be. Likewise, the stronger the vacuum supply, the stronger the suction can be.

In operation, film material 201 is fed into tunnel 224 by both the pushing force provided by film drive 220 and the pulling force provided by vacuum belt 230. These cooperating, yet opposite forces, cause material 201 to be fed in a uniform fashion through tunnel 224. Because they are timed, this uniform feeding is also fluid, thereby allowing for faster operation of the overall machine. The discussed shortcomings in systems only employing a pushing force are overcome because the pulling force created by belt 230 substantially prevents the inadvertent and unwanted bending or jamming of material 201 within tunnel 224. Similarly, the cooperation between cover 226 and bottom 228 prevents the material from being forced off its desired path. All of this improves the efficiency of the tabbed divider making machine. Once through tunnel 224, film material 201 is presented to a tip die 250 or other cutting instrument for cutting of the material to size. For example, if system 210 is employed in machine 20, film material 201 could be supplied to tip dies 112 or 116. Ultimately, this cut material is provided on a portion of the paper stock being manufactured into a tabbed divider, where it can be laminated using a process such as the heating process discussed above.

While discussed in connection with the exemplary embodiment shown in the FIGS. 34-38, it is to be understood that system 210 could vary significantly. For example, use of the improvements of system 210 in conjunction with machine 20 may require some modifications to certain of the components of the system. For one, machine 20 utilizes cartridges 71 and 73 to provide film to machine. These cartridges themselves already include elements which operate to provide the function provided by folding apparatus 216. However, because machine 20 also operates to push film from cartridges 71 and 73, such machine could benefit from the incorporation of structures similar to those disposed within the above-discussed tunnel 224. For instance, incorporating an element similar to vacuum belt 230 into machine 20, without the other elements of system 210, could provide the addition of a pulling force on film in that machine's film delivery system. Of course, the specific way in which power is supplied to a belt like this may differ from the present invention, and could be done in many ways, as would be apparent to those of ordinary skill in the art. One important design aspect would be to ensure that the pulling and pushing forces are timed so as to provide fluid flow of the film material in the machine.

It is also to be understood that all of the elements of system 210 may vary widely in their size, shape, and or material of construction. For example, tunnel 224 is shown as being approximately fourteen (14) inches wide. However, such could vary significantly given the desired size of film being delivered to the tabbed dividers. Likewise, each of the remaining components of both system 210 and machine 20 may vary accordingly.

Finally, the use of system 210 not only allows for the application of well-known and already utilized film material to be applied to a given tabbed divider, but also for thinner and/or more flexible films to be utilized. Because of the combined pushing and pulling effect provided by the present invention, these thinner and/or more flexible films may be provided without the worry of unwanted bending or jamming in the system. For instance, while typical tabbed dividers are laminated with Polyester (PET), the present invention may allow for the use of other materials, such as Polypropylene, Polyethlyene, and others that are less rigid in nature. In addition, film delivery system 210 may be utilized in other applications other than the manufacturing of tabbed dividers. For example, films (including thinner and/or more flexible films) could be applied to packaging or the like through the utilization of film delivery system 210. Of course, film delivery system 210 would most likely need to be tailored to the specific function the machine is being utilized for.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of producing a tabbed divider comprising:
- placing a sheet of paper on a paper feeder of a tabbed divider making apparatus;
- automatically feeding the sheet of paper to a processing section of the tabbed divider making apparatus;
- automatically positioning the sheet of paper on the processing section through the use of a moveable stop;
- providing a folded film to at least a portion of the sheet of paper, the folded film provided by a film cartridge including a main body, a film roll and a fold plate for folding film from the film roll, wherein the fold plate folds film from the film roll prior to the film exiting the cartridge
- automatically laminating at least a portion of the sheet of paper;
- automatically cutting at least a portion of the sheet of paper to create a tab; and
- automatically outputting the tabbed divider with an output tray.

2. The method of claim 1, wherein the placing step includes placing the paper in a vertical direction.

3. The method of claim 1, wherein the cutting step is performed through the use of a knife package.

4. The method of claim 1, wherein the laminating step includes cutting the folded film with a tip die.

5. The method of claim 4, wherein the laminating step includes providing heat to the folded film.

6. The method of claim 5, wherein the heat is provided by a heated roller.

7. The method of claim 1, wherein the outputting step includes outputting the tabbed divider to a conveyor.

8. The method of claim 1, further comprising the step of automatically cutting a portion of film with the apparatus to be applied to the piece of paper prior to the step of automatically laminating.

9. A tabbed divider making apparatus capable of making tabbed dividers having differently positioned tabs from a sheet of paper, the apparatus comprising:
- a paper feeder; and
- a processing section adapted to receive paper from the paper feeder, the processing section including a moveable stop, a tip die configured to cut a portion of film prior to the portion of film being applied to one edge of the paper, and a knife package configured to cut a portion of paper laminated with the film,
- and a film cartridge for providing film for lamination of the tabs and configured to interact with the processing section, wherein the cartridge is removable and includes a main body, a film roll and a fold plate for folding film from the film roll, wherein the fold plate folds film from the film roll prior to the film exiting the cartridge
- wherein interaction between the tip die, the knife package and the moveable stop allows for the making of the tabbed dividers having differently positioned laminated tabs from a sheet of paper.

10. The tabbed divider making apparatus of claim 9, wherein the paper feeder includes a moveable main body having a conveyor.

11. The tabbed divider making apparatus of claim 10, wherein the paper feeder further includes a fixed arm, a moveable arm and a vertical roller structure, wherein paper of different lengths and widths can be accommodated by the paper feeder.

12. The tabbed divider making apparatus of claim 9, wherein the processing section includes two spaced apart tip dies.

13. The tabbed divider making apparatus of claim 12, wherein the processing section includes two tubes, each tube associated with a different tip die.

14. The tabbed divider making apparatus of claim 13, further comprising a second film cartridge for providing film for lamination of the tabs and configured to interact with the processing section, each cartridge section associated with a different tube.

15. The tabbed divider making apparatus of claim 14, wherein the second cartridge is removable and includes a main body, a film roll and a fold plate for folding film from the film roll, wherein each cartridge includes a central opening formed in the main body and an opening interface for engaging one of the tubes.

16. The tabbed divider of claim 15, wherein film is cut by one of the tip dies.

17. The tabbed divider making apparatus of claim 9, wherein the processing section includes a plurality of rollers.

18. The tabbed divider making apparatus of claim 17, wherein at least one of the plurality of rollers are heated rollers.

19. The tabbed divider making apparatus of claim 9, further comprising an output tray adapted to receive paper from the processing section.

20. The tabbed divider making apparatus of claim 19, wherein the output tray includes at least one downwardly opening portion.

21. The tabbed divider making apparatus of claim 20, wherein the output tray is adapted to drop tabbed dividers to a conveyor.

22. The tabbed divider making apparatus of claim 19, wherein the paper feeder feeds sheets of paper in a vertical direction, the processing section laminates a portion of each sheet of paper and cuts a portion of each sheet of paper to form a laminated tabbed divider, and the output tray receives the laminated tabbed divider.

23. The tabbed divider making apparatus of claim 9, wherein the tabbed dividers produced by the apparatus include differently positioned tabs.

24. The tabbed divider making apparatus of claim 9, wherein the apparatus is adapted to produce collated or uncollated tabbed divider sets depending upon automatic control of the apparatus.

25. A tabbed divider making apparatus capable of making tabbed dividers having laminated tabs on a sheet of paper, the apparatus comprising:

a paper feeder for holding a plurality of the sheets of paper and feeding each sheet of paper to the remaining elements of the apparatus;

a film delivery system for providing each sheet of paper with a portion of film material, the film delivery system including a source of the film material, a film drive for pushing the film material, and a frictional engagement belt for pulling the film material; and a processing section adapted to receive paper from the paper feeder and create the tabs thereon.

26. The tabbed divider making apparatus of claim 25, wherein the belt is enclosed in a tunnel which includes a cover disposed over a bottom portion.

27. The tabbed divider making apparatus of claim 26, wherein the cover is constructed of a transparent material.

28. The tabbed divider making apparatus of claim 26, wherein the cover is u-shaped and the belt is disposed under the cover.

29. The tabbed divider making apparatus of claim 28, wherein the belt is disposed within a channel formed in the bottom portion.

30. The tabbed divider making apparatus of claim 29, wherein the belt includes at least one aperture.

31. The tabbed divider making apparatus of claim 30, wherein the belt includes a plurality of apertures.

32. The tabbed divider making apparatus of claim 30, wherein the channel formed in the bottom portion is in fluid communication with a vacuum supply, such that suction is created through the at least one aperture.

33. The tabbed divider making apparatus of claim 25, wherein the film drive is mechanically connected with the belt, such that the film drive and the belt are mechanically timed with respect to one another.

34. The tabbed divider making apparatus of claim 33, wherein the film drive includes two drive rollers, one of the drive rollers being connected to the belt.

35. The tabbed divider making apparatus of claim 34, wherein the film delivery system further includes a folding apparatus for folding the film material.

36. The tabbed divider making apparatus of claim 35, wherein the apparatus for folding includes two folding rollers.

37. The tabbed divider making apparatus of claim 25, wherein the film delivery system is capable of providing thin films.

* * * * *